US008373767B2

(12) United States Patent
Chang et al.

(10) Patent No.: US 8,373,767 B2
(45) Date of Patent: Feb. 12, 2013

(54) DIGITAL PHOTOGRAPHING APPARATUS, METHOD OF CONTROLLING THE DIGITAL PHOTOGRAPHING APPARATUS, AND RECORDING MEDIUM STORING PROGRAM TO IMPLEMENT THE METHOD

(75) Inventors: Soon-keun Chang, Suwon-si (KR); Rae-hong Park, Seoul (KR); Tae-hong Min, Seoul (KR)

(73) Assignees: Samsung Electronics Co., Ltd., Suwon-si (KR); Industry-University Cooperation Foundation Sogang University, Seoul (KR)

( * ) Notice: Subject to any disclaimer, the term of this patent is extended or adjusted under 35 U.S.C. 154(b) by 412 days.

(21) Appl. No.: 12/823,386

(22) Filed: Jun. 25, 2010

(65) Prior Publication Data
US 2010/0328482 A1 Dec. 30, 2010

(30) Foreign Application Priority Data
Jun. 26, 2009 (KR) ........................ 10-2009-0057723

(51) Int. Cl.
*H04N 5/228* (2006.01)
*H04N 5/235* (2006.01)
(52) U.S. Cl. ................ 348/222.1; 348/362; 348/208.12; 382/224
(58) Field of Classification Search .................. 348/362, 348/229.1, 221.1, 208.12, 222.1, E05.024, 348/154, 208.1, 208.4, 208.13
See application file for complete search history.

(56) References Cited

U.S. PATENT DOCUMENTS

| 4,296,436 | A | * | 10/1981 | Achiha | 348/620 |
| 5,508,751 | A | * | 4/1996 | Nitta | 348/607 |
| 7,672,536 | B2 | * | 3/2010 | Kondo et al. | 382/276 |
| 2002/0097324 | A1 | * | 7/2002 | Onuki | 348/208 |
| 2008/0170124 | A1 | * | 7/2008 | Hatanaka et al. | 348/208.4 |
| 2008/0180534 | A1 | * | 7/2008 | Murayama | 348/208.4 |
| 2008/0317289 | A1 | * | 12/2008 | Oyaizu | 382/107 |
| 2009/0167957 | A1 | * | 7/2009 | Joo et al. | 348/687 |
| 2009/0244318 | A1 | * | 10/2009 | Makii | 348/229.1 |
| 2010/0091119 | A1 | * | 4/2010 | Lee | 348/208.4 |
| 2011/0317032 | A1 | * | 12/2011 | Yamashita et al. | 348/229.1 |

OTHER PUBLICATIONS

Debevec et al., "Recovering High Dynamic Range Radiance Maps from Photographs," *Proc. ACM SIGGRAPH*, pp. 369-378, Los Angeles, CA (Aug. 1997).

* cited by examiner

*Primary Examiner* — Hung Lam
(74) *Attorney, Agent, or Firm* — Drinker Biddle & Reath LLP

(57) ABSTRACT

A digital photographing apparatus capable of acquiring data about an image having a wide dynamic range and a high grayscale resolution, a method of controlling the digital photographing apparatus, and a recording medium storing a program to implement the method are provided. An embodiment includes an imaging device that acquires a reference image and additional images at different exposures and a multi-level threshold map generation unit that classifies the pixels of the images into levels according to brightness. The embodiment further includes a motion data acquiring unit that acquires motion data for each pixel based on its respective brightness level and a first weight data acquiring unit that acquires first weight data based on the motion data of each pixel. In addition, the embodiment includes a final image data acquiring unit that synthesizes the pixels of the reference image and the additional images based on first weight data.

20 Claims, 14 Drawing Sheets

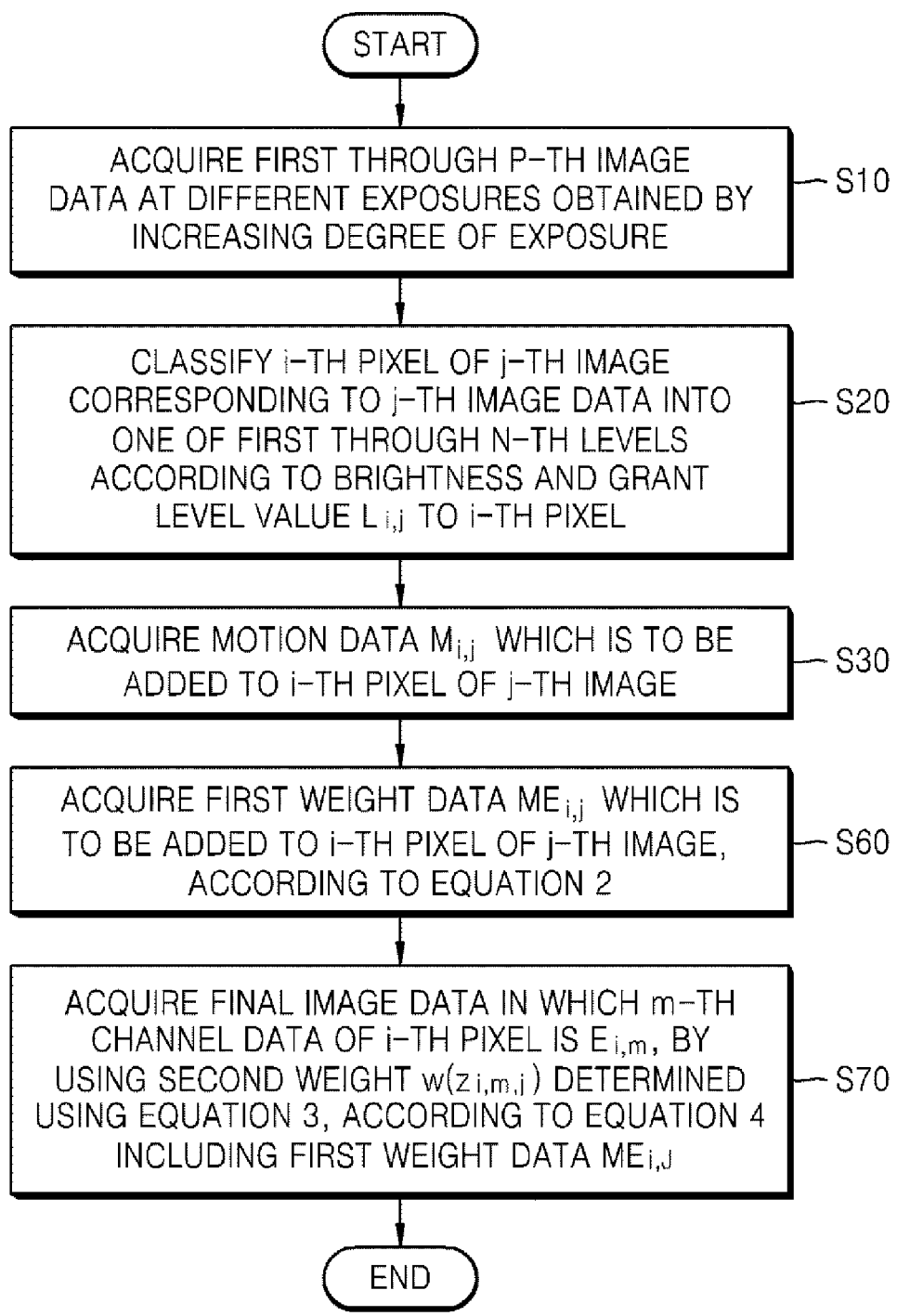

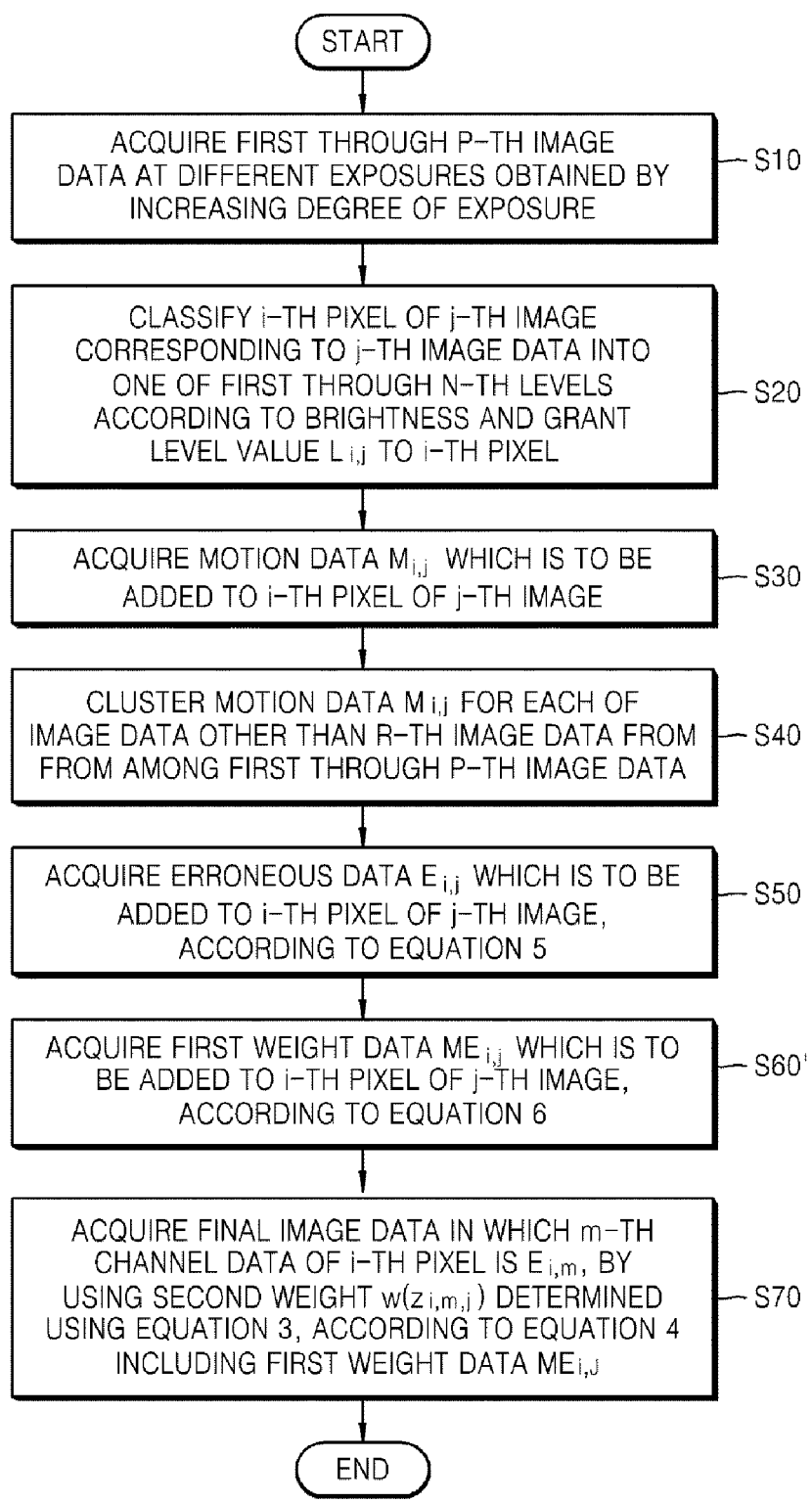

DIGITAL PHOTOGRAPHING APPARATUS, METHOD OF CONTROLLING THE DIGITAL PHOTOGRAPHING APPARATUS, AND RECORDING MEDIUM STORING PROGRAM TO IMPLEMENT THE METHOD

CROSS-REFERENCE TO RELATED PATENT APPLICATION

This application claims the benefit of Korean Patent Application No. 10-2009-0057723, filed on Jun. 26, 2009, in the Korean Intellectual Property Office, the disclosure of which is incorporated herein in its entirety by reference.

BACKGROUND

Embodiments of the invention relate to a digital photographing apparatus, a method of controlling the same, and a recording medium storing a program to implement the method, and more particularly, to a digital photographing apparatus capable of acquiring data associated with an image having a wide dynamic range and a high grayscale resolution, a method of controlling the digital photographing apparatus, and a recording medium storing a program to implement the method.

Generally, a digital photographing apparatus acquires data from light incident on an imaging device and stores the data in a storage medium or displays the data as an image on a display unit. Typically, the digital photographing apparatus automatically determines an optimal degree of exposure according to conditions such as the amount of light radiated during a photographing operation, and acquires image data from light that is incident on the imaging device at an appropriate exposure.

The quality of an image from image data generated by the imaging device depends upon a dynamic range and a grayscale. The larger a difference between the highest brightness and the lowest brightness of an image is, the wider the dynamic range of the image is. In turn, the wider the dynamic range of the image is, the more varied the levels of brightness used to represent the image. As an image has areas having various brightness levels due to gentle changes between brightness levels from bright areas to dark areas of the image, the grayscale of the image is good, that is, the image has a high grayscale resolution.

However, when the digital photographing apparatus acquires image data at a specific exposure, the brightness levels and colors of pixels which are displayed are limited to certain ranges. For example, an image from image data obtained during a long exposure is entirely bright and thus the lowest brightness of the image is higher than a specific brightness. An image from image data obtained during a short exposure is entirely dark and thus the highest brightness of the image is lower than the specific brightness. Thus, the dynamic range of the image is narrow. In particular, in a situation where a bright light source exists in some area of a dark indoor location such as in a backlight situation or the like, a greatly-bright area and a greatly-dark area co-exist and information about a subject and a grayscale are destroyed when image data is acquired.

SUMMARY

Various embodiments of the invention provide a digital photographing apparatus capable of acquiring data about an image having a wide dynamic range and a high grayscale resolution, a method of controlling the digital photographing apparatus, and a recording medium storing a program to implement the method.

According to an embodiment of the invention, there is provided a digital photographing apparatus including an imaging device that acquires a reference image at a first exposure, and a plurality of additional images at exposures different from the first exposure, the reference image and the plurality of additional images each having a plurality of pixels. The embodiment includes a multi-level threshold map generation unit that classifies the plurality of pixels of each of the reference image and the plurality of additional images into a plurality of levels according to brightness. The embodiment further includes a motion data acquiring unit that acquires motion data for each pixel of the plurality of additional images, wherein the motion data for a pixel is a first motion data value if the pixel is in a non-motion area when compared to the reference image and a second motion data value if the pixel is in a motion area when compared to the reference image. In addition, the embodiment includes a first weight data acquiring unit that acquires first weight data, wherein the first weight data is a first weight for pixels with the first motion data value and a second weight lower than the first weight for pixels with the second motion data value.

According to an embodiment of the invention, there is provided a digital photographing apparatus comprising: an imaging device that acquires a reference image at a first exposure, and a plurality of additional images at exposures different from the first exposure, the reference image and the plurality of additional images each having a plurality of pixels; a motion data acquiring unit that acquires motion data for each pixel of the plurality of additional images, wherein the motion data for a pixel is a first motion data value if the pixel is in a non-motion area when compared to the reference image and a second motion data value if the pixel is in a motion area when compared to the reference image; a first weight data acquiring unit that acquires first weight data, wherein the first weight data is a first weight for pixels with the first motion data value and a second weight lower than the first weight for pixels with the second motion data value; and a final image data acquiring unit that synthesizes the pixels of the reference image and the plurality of additional images based on first weight data.

An embodiment of the digital photographing apparatus further comprises a multi-level threshold map generation unit that classifies the plurality of pixels of each of the reference image and the plurality of additional images into a plurality of levels according to brightness.

In an embodiment, the motion data for an i-th pixel of a j-th image with a level value of $L_{i,j}$ is $M_{i,j}$ and is assigned according to Equation 1 based on the reference image R and an i-th pixel of the reference image R with a level value of $L_{i,R}$:

$$M_{i,j} = \begin{cases} \alpha, & \text{for } j = R \\ \beta, & \text{for } |L_{i,R} - L_{i,j}| \geq 1, j \neq R \\ \alpha, & \text{otherwise} \end{cases} \quad \text{[Equation 1]}$$

$$(0 \leq \alpha < \beta)$$

In an embodiment, first weight data for an i-th pixel of a j-th image is $ME_{i,j}$ and is assigned according to Equation 2 based on the reference image R:

$$ME_{i,j} = \begin{cases} \gamma, & \text{for } j = R \\ \gamma, & \text{for } M_{i,j} = \alpha, j \neq R \\ \delta, & \text{for } M_{i,j} = \beta, j \neq R \end{cases} \quad \text{[Equation 2]}$$

$$(\gamma > \delta \geq 0).$$

In an embodiment, when a response function of the digital photographing apparatus is f(x), an exposure time used when the j-th image data is acquired is $\Delta t_j$, m-th channel data of the i-th pixel of the j-th image data is $z_{i,m,j}$, m-th channel data having a maximum value from among respective m-th channel data of the pixels of the j-th image data is $z_{max,m,j}$, and m-th channel data having a minimum value from among the respective m-th channel data of the pixels of the j-th image data is $z_{min,m,j}$, the final image data acquiring unit may acquire the final image data in which the m-th channel data of the i-th pixel is $E_{i,m}$, by using a second weight $w(z_{i,m,j})$ determined using Equation 3, according to Equation 4:

$$w(z_{i,m,j}) = \begin{cases} z_{i,m,j} - z_{min,m,j}, & \text{for } z_{i,m,j} \leq \frac{1}{2}\left(\begin{array}{c} z_{min,m,j} + \\ z_{max,m,j} \end{array}\right) \\ z_{max,m,j} - z_{i,m,j}, & \text{otherwise} \end{cases} \quad \text{[Equation 3]}$$

$$\ln E_{i,m} = \frac{\sum_{j=1}^{P} w(z_{i,m,j})(ME_{i,j})(\ln f^{-1}(z_{i,m,j}) - \ln \Delta t_j)}{\sum_{j=1}^{P} w(z_{i,m,j})(ME_{i,j})} \quad \text{[Equation 4]}$$

In an embodiment, the multi-level threshold map generation unit performs the classification of the plurality of pixels of an image such that a pixel having the lowest brightness in the image belongs to a first brightness level and a pixel having a higher brightness belongs to a level higher than the first brightness level.

In an embodiment, the motion data acquiring unit is designed to correct a pixel having a motion data of 0 to have a motion data of 1 if the pixel is surrounded by pixels having motion data of 1, and to correct a pixel having a motion data of 1 to have a motion data of 0 if the pixel is surrounded by pixels having motion data of 0.

According to another embodiment of the invention, the digital photographing apparatus further includes an error data acquiring unit that acquires error data $E_{i,j}$ according to Equation 5 when brightness data of an i-th pixel of a j-th image is $I_{i,j}$ and brightness data of a pixel that functions to distinguish a k-th level and a (k+1)th level from each other from among the pixels of the j-th image is $T_{j,k}$:

$$E_{i,j} = \begin{cases} \zeta, & \text{for } T_{j,k} - 1 \leq I_{i,j} \leq T_{j,k} + 1 \\ \eta, & \text{otherwise} \end{cases} \quad \text{[Equation 5]}$$

$$(1 \leq k < N)(\zeta > \eta \geq 0)$$

In an embodiment, first weight data for an i-th pixel of a j-th image is $ME_{i,j}$ and is assigned according to Equation 6 based on the reference image R:

$$ME_{i,j} = \begin{cases} \gamma, & \text{for } j = R \\ \gamma, & \text{for } M_{i,j} = \alpha, E_{i,j} = E_{i,R} = \eta, j \neq R \\ \delta, & \text{for } M_{i,j} = \beta, E_{i,j} = E_{i,R} = \eta, j \neq R \\ \varepsilon, & \text{for } E_{i,j} | E_{i,R} = \zeta, j \neq R \end{cases} \quad \text{[Equation 6]}$$

$$(\gamma > \varepsilon > \delta \geq 0)$$

According to another embodiment of the invention, there is provided a method of controlling a digital photographing apparatus, the method comprising: acquiring a reference image at a first exposure, and a plurality of additional images at exposures different from the first exposure, the reference image and the plurality of additional images each having a plurality of pixels; acquiring motion data for each pixel of the plurality of additional images, wherein the motion data for a pixel is a first motion data value if the pixel is in a non-motion area when compared to the reference image and a second motion data value if the pixel is in a motion area when compared to the reference image; acquiring first weight data, wherein the first weight data is a first weight for pixels with the first motion data value and a second weight lower than the first weight for pixels with the second motion data value; and synthesizing the pixels of the reference image and the plurality of additional images based on first weight data.

In an embodiment, the method further comprises classifying the plurality of pixels of each of the reference image and the plurality of additional images into a plurality of levels according to brightness.

In an embodiment, the motion data for an i-th pixel of a j-th image with a level value of $L_{i,j}$ is $M_{i,j}$ and is assigned according to Equation 1 based on the reference image R and an i-th pixel of the reference image R with a level value of $L_{i,R}$.

In an embodiment, first weight data for an i-th pixel of a j-th image is $ME_{i,j}$ and is assigned according to Equation 2 based on the reference image R.

In an embodiment, when a response function of the digital photographing apparatus is f(x), an exposure time used when the j-th image data is acquired is $\Delta t_j$, m-th channel data of the i-th pixel of the j-th image data is $z_{i,m,j}$, m-th channel data having a maximum value from among respective m-th channel data of the pixels of the j-th image data is $z_{max,m,j}$, and m-th channel data having a minimum value from among the respective m-th channel data of the pixels of the j-th image data is $z_{min,m,j}$, the final image data is acquired in which the m-th channel data of the i-th pixel is $E_{i,m}$, by using a second weight $w(z_{i,m,j})$ determined using Equation 3, according to Equation 4.

In an embodiment, the plurality of pixels of an image are classified such that a pixel having the lowest brightness in the image belongs to a first brightness level and a pixel having a higher brightness belongs to a level higher than the first brightness level.

In an embodiment, after acquiring the motion data $M_{i,j}$ for the i-th pixel of the j-th image according to Equation 1, a pixel having a motion data of 0 is corrected to have a motion data of 1 if the pixel is surrounded by pixels having motion data of 1, and a pixel having a motion data of 1 is corrected to have a motion data of 0 if the pixel is surrounded by pixels having motion data of 0.

In an embodiment, error data $E_{i,j}$ is acquired according to Equation 5 when brightness data of an i-th pixel of a j-th image is $I_{i,j}$ and brightness data of a pixel that functions to distinguish a k-th level and a (k+1)th level from each other from among the pixels of the j-th image is $T_{j,k}$.

In an embodiment, first weight data for an i-th pixel of a j-th image is $ME_{i,j}$ and is assigned according to Equation 6 based on the reference image R.

According to another embodiment of the invention, there is provided recording media having recorded thereon programs for executing the above-described methods.

According to another embodiment, a method of controlling a digital photographing apparatus comprises acquiring a reference image at a first exposure, the reference image having a plurality of pixels and acquiring a first image and a second image, each at exposures different from the first exposure and each having a plurality of pixels. The method further includes classifying the plurality of pixels of the reference image and the first and second images into a plurality of levels based on brightness and determining which pixels of the first and second images belong to motion areas and which pixels of the first and second images belong to non-motion areas based on their respective brightness levels. In addition, the method includes assigning a higher weight value to each of the plurality of pixels of the first and second images belonging to non-motion areas than to each of the plurality of pixels of the first and second images belonging to motion areas.

BRIEF DESCRIPTION OF THE DRAWINGS

The above and other features and advantages of embodiments of the invention will become more apparent by describing in detail exemplary embodiments thereof with reference to the attached drawings in which:

FIG. 6 is a flowchart schematically illustrating a method of controlling a digital photographing apparatus, according to another embodiment of the invention;

FIG. 11 is a flowchart schematically illustrating a method of controlling a digital photographing apparatus, according to another embodiment of the invention.

DETAILED DESCRIPTION OF THE EMBODIMENTS

Various embodiments of the invention will now be described more fully with reference to the accompanying drawings, in which exemplary embodiments of the invention are shown.

As described above, when a digital photographing apparatus acquires image data at a specific exposure, brightness levels and colors of pixels which are displayed are limited to certain ranges. For example, an image from image data obtained during a long exposure is entirely bright and thus the lowest brightness of the image is higher than a specific brightness. An image from image data obtained during a short exposure is entirely dark and thus the highest brightness of the image is lower than the specific brightness. Thus, the dynamic range of the image is narrow. In particular, in a situation where a bright light source exists in some area of a dark indoor location, in a backlight situation, or the like, a very bright area and a very dark area co-exist, and accordingly information about a subject and a grayscale are destroyed when image data is acquired.

To address this problem, synthesis of a plurality of pieces of image data obtained at different exposures may be considered. In other words, after first image data, which is relatively dark, is acquired during a short exposure, second image data is acquired during a moderate length exposure, and third image data, which is relatively bright, is acquired during a long exposure, the first image data, the second image data, and the third image data are synthesized to obtain final image data. In this way, final image data about a final image having a wide dynamic range and a high grayscale resolution may be obtained. However, the first image data, the second image data, and the third image data are acquired at different times and thus a subject or the like may move. In spite of that, if the first image data, the second image data, and the third image data are simply synthesized together, positions of the subject within images do not match each other, causing the final image to be blurred. Consequently, the quality of the final image may be degraded. Accordingly, when a second image is used as a reference image, it is not desirable that data of an area of a first image that has been moved from a corresponding area of the second image be synthesized with the second image data in the same way as a method in which data of an area of the first image that has not been moved from a corresponding area of the second image is synthesized with the second image, and likewise for a third image. Thus, there remains a need for accurate detection of motion areas.

Figure 1:
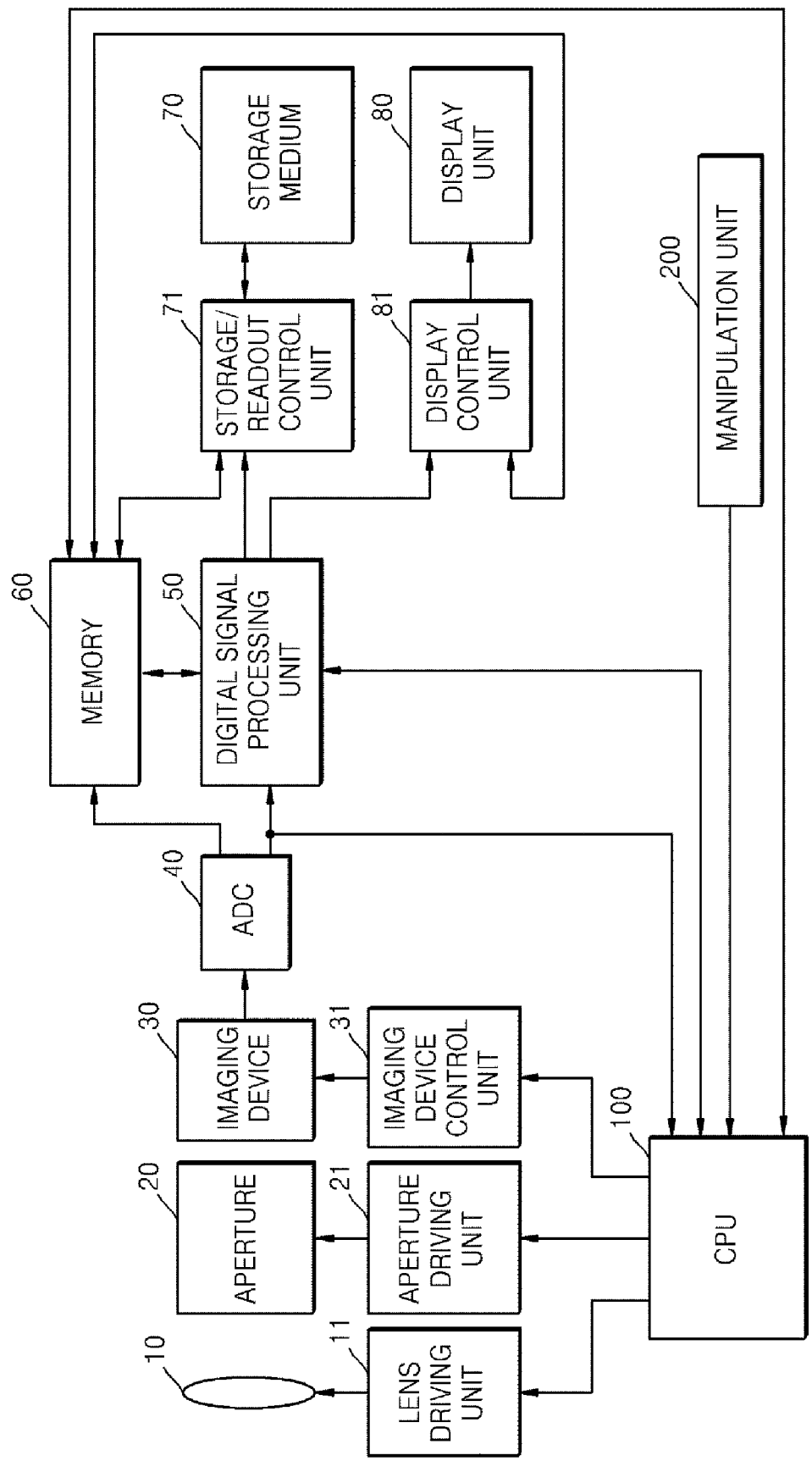
FIG. 1 is a block diagram of a digital photographing apparatus according to an embodiment of the invention.
Figure 2:
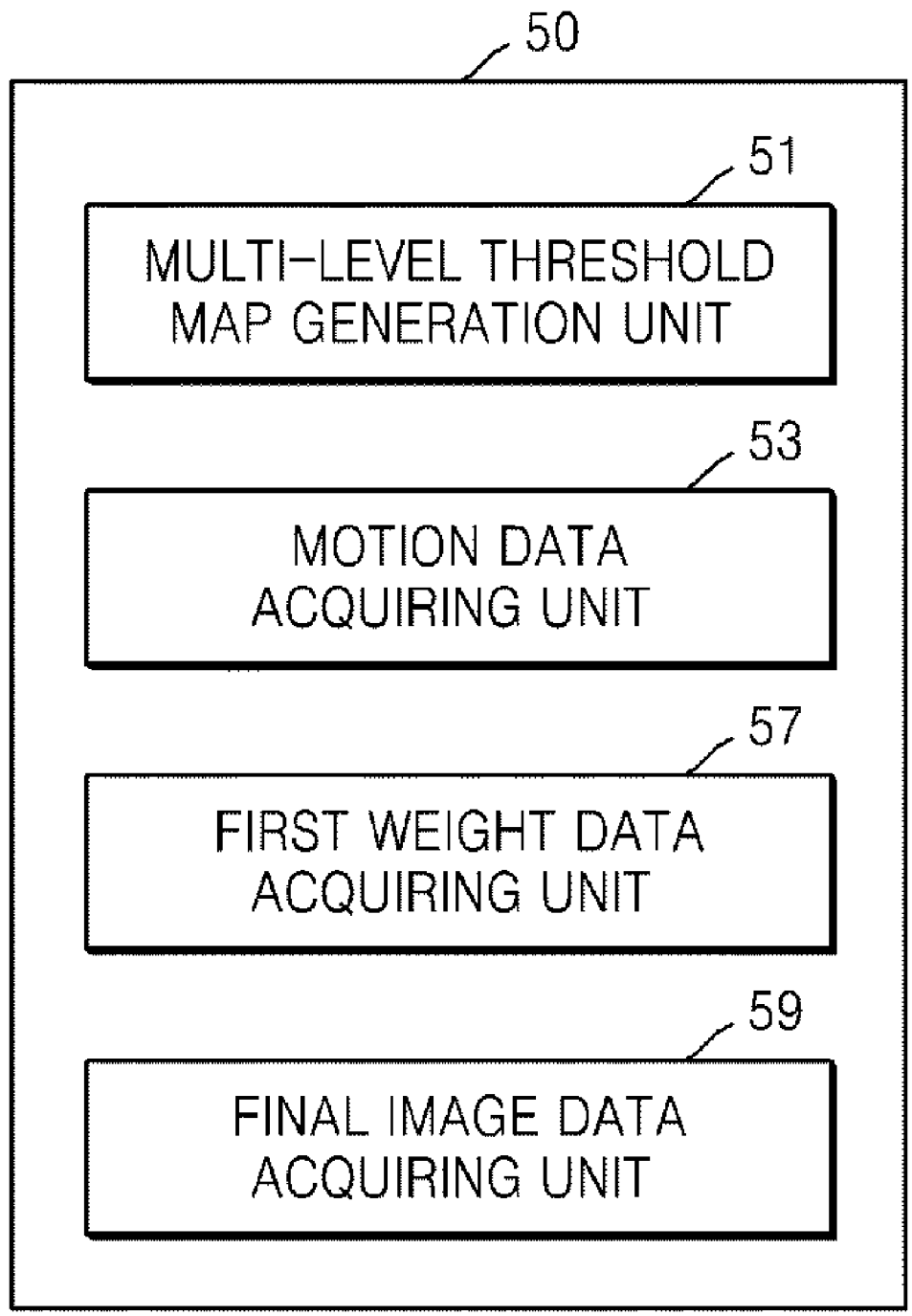
FIG. 2 is a block diagram of a portion of the digital photographing apparatus of FIG. 1, according to an embodiment of the invention.

FIG. 1 is a block diagram of a digital photographing apparatus according to an embodiment of the invention. FIG. 2 is a conceptual diagram of a portion of the digital photographing apparatus of FIG. 1.

The entire operation of the digital photographing apparatus is controlled by a central processing unit (CPU) 100. The digital photographing apparatus includes a manipulation unit 200 including a key and the like, which generates an electrical signal corresponding to a user's manipulation. The electrical signal is transmitted from the manipulation unit 200 to the CPU 100 so that the CPU 100 can control the digital photographing apparatus according to the electrical signal.

In a photographing mode, as the electrical signal corresponding to the user's manipulation is applied to the CPU 100, the CPU 100 examines the electrical signal and controls a lens driving unit 11, an aperture driving unit 21, and an imaging device control unit 31, whereby the position of a lens 10, the degree of opening of an aperture 20, the sensitivity of an imaging device 30, and the like are controlled, respectively. The imaging device 30 generates image data from incident light. An analog-to-digital converter (ADC) 40 converts the image data, which is analog data output from the imaging device 30, into digital data. The ADC 40 may not be installed according to the characteristics of the imaging device 30.

The data generated from the imaging device 30 may be input to a digital signal processing unit 50 via a memory 60 or may be input to the digital signal processing unit 50 without passing through the memory 60. In some cases, the data may also be input to the CPU 100. The memory 60 may include a ROM, a RAM, or the like. The digital signal processing unit 50 may perform digital signal processing, such as gamma correction or white balance control. As will be described more fully later, the digital signal processing unit 50 includes a multi-level threshold map generation unit 51, a motion data acquiring unit 53, a first weight data acquiring unit 57, and a final image data acquiring unit 59, and thus acquire final image data about a final image having a wide dynamic range and a high grayscale resolution. The multi-level threshold map generation unit 51, the motion data acquiring unit 53, the first weight data acquiring unit 57, and the final image data acquiring unit 59 may be components separate from the digital signal processing unit 50, that is, may not be included in the digital signal processing unit 50. Alternatively, the multi-level threshold map generation unit 51, the motion data acquiring unit 53, the first weight data acquiring unit 57, and the final image data acquiring unit 59 may be a part of another component. As such, the structure of the digital signal processing unit 50 may vary. In other words, the digital photographing apparatus according to the present embodiment has only to include the digital signal processing unit 50 including the multi-level threshold map generation unit 51, the motion data acquiring unit 53, the first weight data acquiring unit 57, and the final image data acquiring unit 59. Functions of the multi-level threshold map generation unit 51, the motion data acquiring unit 53, the first weight data acquiring unit 57, and the final image data acquiring unit 59 will be described later.

Data output from the digital signal processing unit 50 may be transmitted to a display control unit 81 via the memory 60 or may be directly transmitted to the display control unit 81. The display control unit 81 controls a display unit 80 to display images on the display unit 80. The data output from the digital signal processing unit 50 may also be input to a storage/readout control unit 71 via the memory 60 or may be directly transmitted to the storage/readout control unit 71. The storage/readout control unit 71 may store data in a storage medium 70 according to a generated signal corresponding to a user's manipulation or in an automatic manner. The storage/readout control unit 71 may read out image data from a file stored in the storage medium 70 and input the read-out image data to the display control unit 81 via the memory 60 or via another path so that images can be displayed on the display unit 80. The storage medium 70 may be detachable from or may be fixed to the digital photographing apparatus.

The digital photographing apparatus according to the present embodiment does not necessarily include all of the components described above. The digital photographing apparatus according to the present embodiment has only to include the digital signal processing unit 50 including the multi-level threshold map generation unit 51, the motion data acquiring unit 53, the first weight data acquiring unit 57, and the final image data acquiring unit 59. Functions of the multi-level threshold map generation unit 51, the motion data acquiring unit 53, the first weight data acquiring unit 57, and the final image data acquiring unit 59 will now be described with reference to FIGS. 3A through 3C, FIGS. 4A through 4C, and FIGS. 5A and 5B.

Figure 3A:
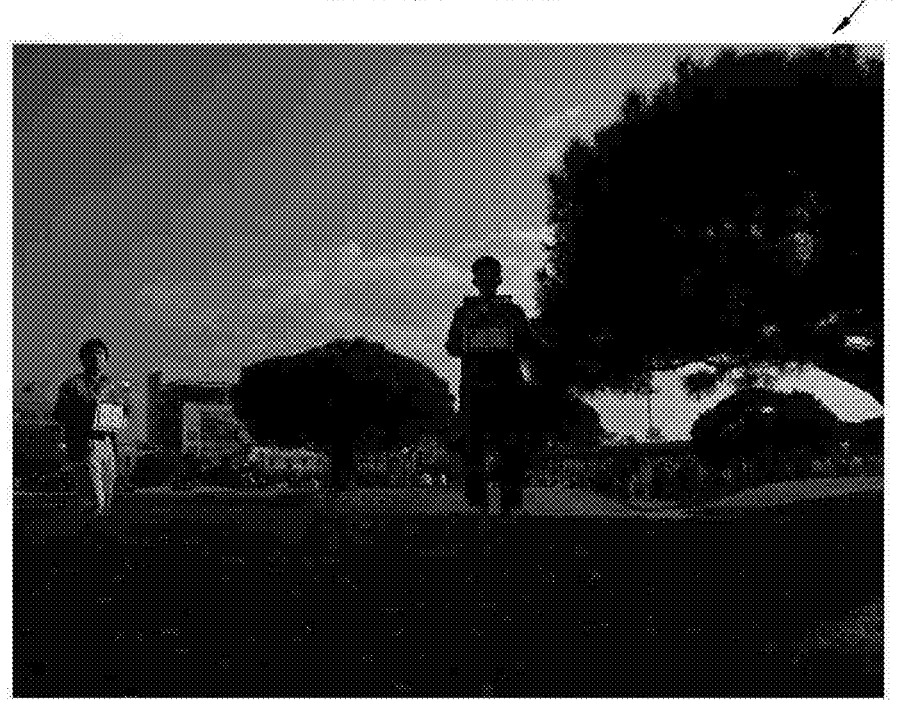
FIGS. 3A through 3C are pictorial diagrams schematically illustrating images obtained from first, second, and third image data that are obtained when the digital photographing apparatus is exposed at different exposures.
Figure 3B:
Figure 3C:
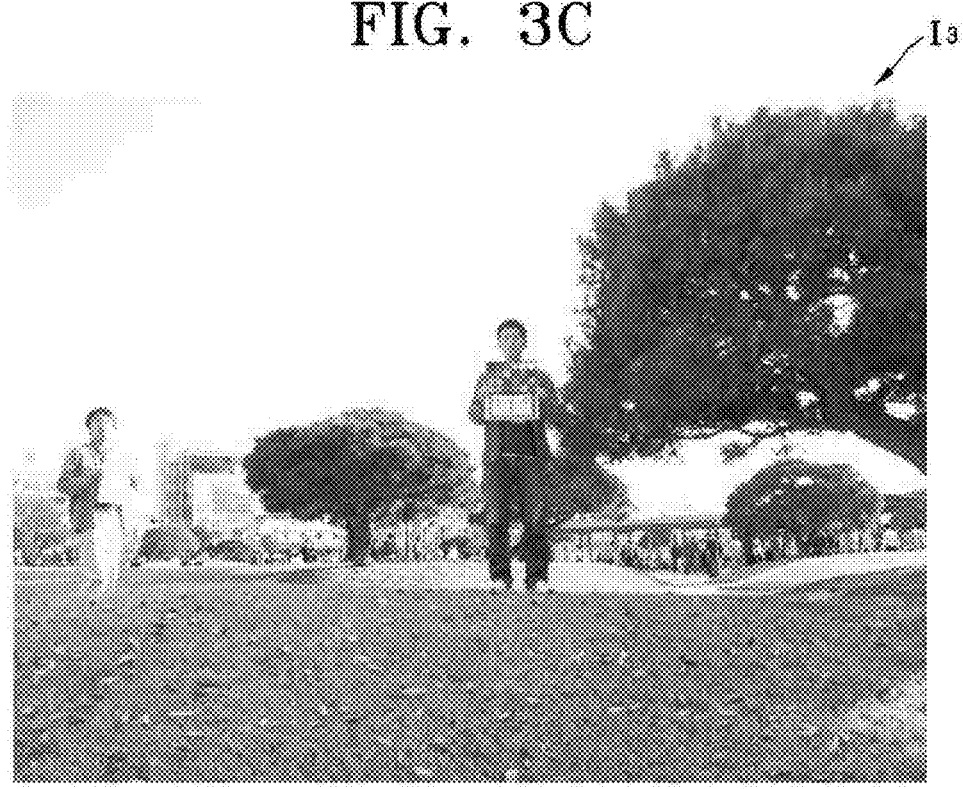

The imaging device 30 of the digital photographing apparatus according to the present embodiment acquires first through P-th image data while increasing the degree of exposure so as to obtain different exposures. In an alternative embodiment, the digital photographing apparatus acquires first through P-th image data while decreasing the degree of exposure so as to obtain different exposures. Here, P denotes a positive integer. In the present embodiment, for example, the imaging device 30 acquires the first through third image data. The first image data may be acquired during a short exposure, the second image data may be acquired during a moderate length exposure, and the third image data may be acquired during a long exposure. This case corresponds to a case where P is equal to 3. FIGS. 3A through 3C are conceptual diagrams schematically illustrating a first image $I_1$, a second image $I_2$, and a third image $I_3$ obtained from the first image data, the second image data, and the third image data obtained while increasing the degree of exposure so as to obtain different exposures. Referring to FIGS. 3A through 3C, the first image $I_1$ from the first image data is entirely dark, the second image $I_2$ from the second image data is of medium brightness, and the third image $I_3$ from the third image data is entirely bright. For the sake of convenience, a case where an imaging device acquires the first through third image data corresponding to the first through third images $I_1$ through $I_3$ (that is, P=3) and the second image data is image data obtained during a moderate length exposure will now be described.

As for j-th image data, the multi-level threshold map generation unit 51 classifies an i-th pixel of a j-th image corresponding to the j-th image data into one of first through N-th levels according to brightness and grants, to the i-th pixel, a level value $L_{i,j}$ of the level to which the i-th pixel belongs. The classification is performed so that the numbers of pixels belonging to the respective levels are identical to one another, and is applied to each of first through P-th image data (that is, P=3). Here, N denotes a positive integer. The multi-level threshold map generation unit 51 may perform the classification so that a pixel having the lowest brightness belongs to the first level and a pixel having the highest brightness belongs to the N-th level.

For example, if the j-th image from the j-th image data has 160000 pixels, the 160000 pixels may be classified into 8 levels so that 20000 pixels belong to each of the 8 levels. In this case, N is equal to 8. The 160000 pixels may be arranged according to brightness, that is, in a sequence from a pixel having the lowest brightness to a pixel having the highest brightness. Then, the 160000 pixels may be classified in such a way that 20000 pixels starting from the pixel having the lowest brightness are classified into a first level, the next 20000 pixels are classified into a second level, and the next 20000 pixels are classified into a third level. If the i-th pixel of the j-th image from the j-th image data belongs to the third level, the i-th pixel has a level value of $L_{i,j}=3$.

Figure 4A:
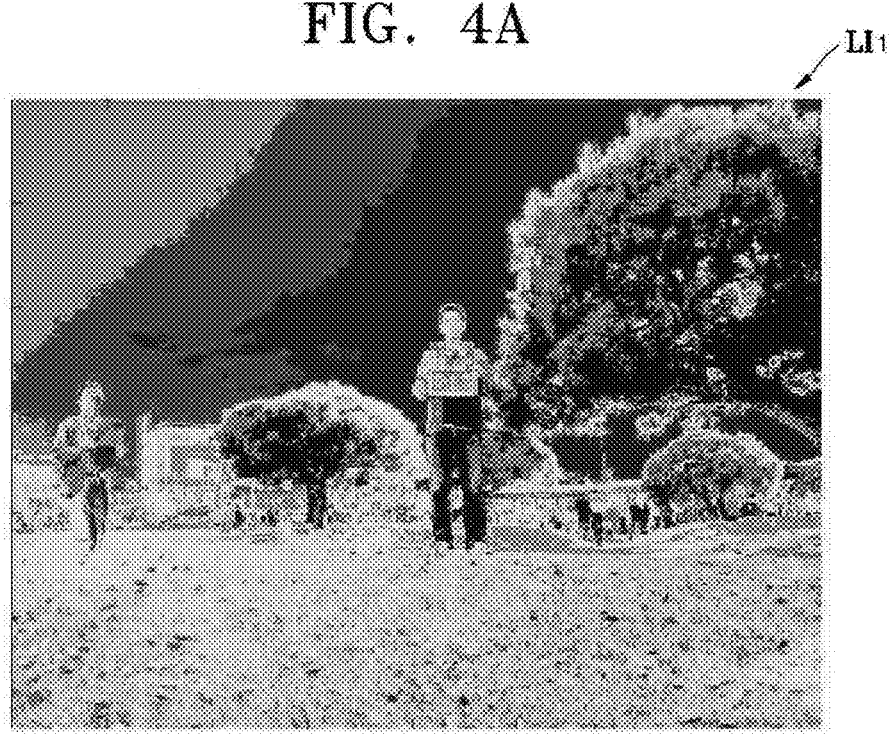
FIGS. 4A through 4C are pictorial diagrams illustrating first through third multi-level threshold maps that schematically represent pixels according to levels into which the pixels of the first through third image data are classified by a multi-level threshold map generation unit of the digital photographing apparatus illustrated in FIGS. 1 and 2.
Figure 4B:
Figure 4C:
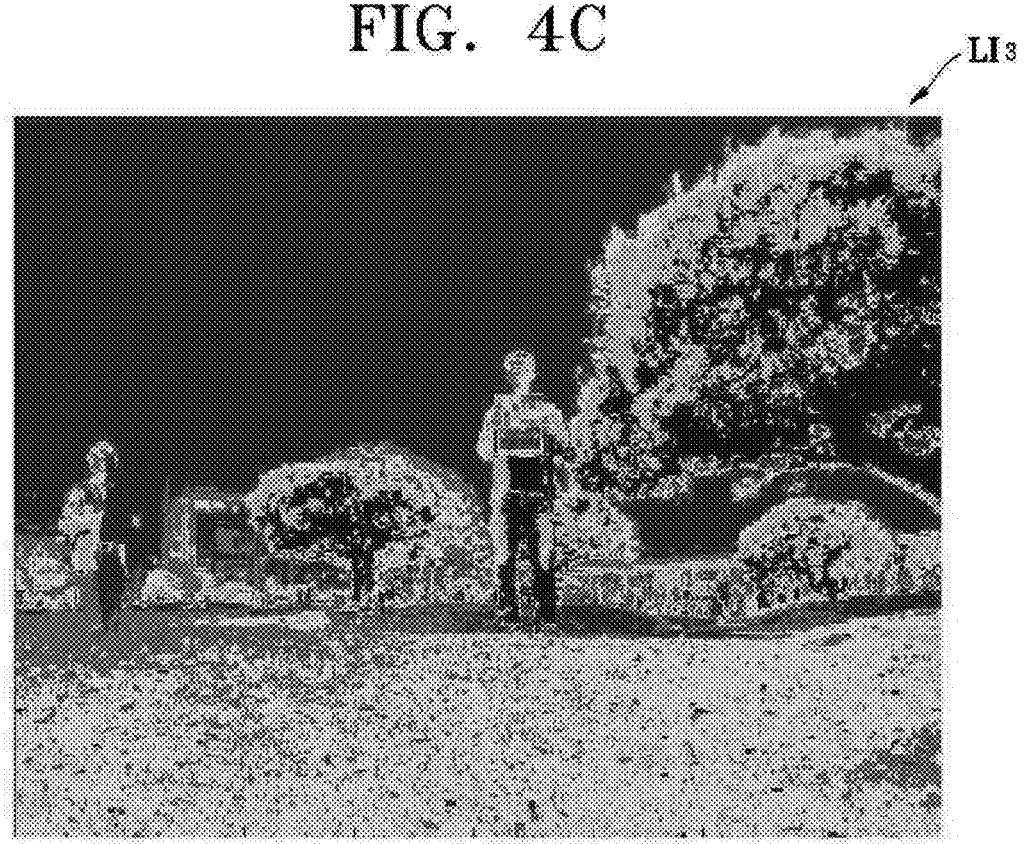

FIGS. 4A through 4C illustrate first, second, and third multi-level threshold maps $LI_1$, $LI_2$, and $LI_3$ that schematically represent the respective pixels of the first, second, and third images $I_1$, $I_2$, and $I_3$, respectively, illustrated in FIGS. 3A through 3C according to the levels into which the pixels are classified by the multi-level threshold map generation unit 51. In FIG. 4A, pixels that belong to the same level display the same color, for example, pixels that belong to the first level display the same color, pixels that belong to the second level display the same color, and pixels that belong to the third level display the same color. This rule is equally applied to FIGS. 4B and 4C. The brightness of the pixels belonging to the first level in FIG. 4A may be different from that of pixels belonging to the first level in FIG. 4B or 4C, and this rule is equally applied to levels other than the first level. This is because the pixels of FIG. 4A generally have relatively low brightness, the pixels of FIG. 4C generally have relatively high brightness, and the pixels of FIG. 4B are of medium brightness.

If image data acquired during a moderate length exposure from among the first through P-th image data is R-th image data, the motion data acquiring unit 53 acquires motion data $M_{i,j}$ which is to be added to the i-th pixel of the j-th image, according to Equation 1. In this way, pieces of motion data to be granted to all pixels of each of first through P-th images from the first through P-th image data are acquired.

$$M_{i,j} = \begin{cases} \alpha, & \text{for } j = R \\ \beta, & \text{for } |L_{i,R} - L_{i,j}| \geq 1, j \neq R \\ \alpha, & \text{otherwise} \end{cases} \quad \text{[Equation 1]}$$

$$(0 \leq \alpha < \beta)$$

For example, $\alpha=0$, and $\beta=1$. Pixels of an R-th image from the R-th image data acquired during a moderate length exposure, which serves as a reference image, all have motion data of $\alpha$ (for example, 0) and are thus considered to belong to a non-motion area. Pixels having the motion data of $\alpha$ (for example, 0) from among the pixels of images from pieces of image data other than the R-th image data belong to an area that does not move as compared with the R-th image, and pixels having motion data of $\beta$ (for example, 1) from among the pixels of the images from the pieces of image data other than the R-th image data belong to an area that has moved (i.e., a motion area) as compared with the R-th image.

The pixels having the motion data of $\beta$ (for example, 1) from among the pixels of the images from the pieces of image data other than the R-th image data correspond to a case where $|L_{i,R}-L_{i,j}| \geq 1$. This case means that the level value of the i-th pixel of the j-th image is different from that of an i-th pixel of the R-th image.

It is assumed that the first through third image data about the first through third images $I_1$ through $I_3$ illustrated in FIGS. 3A through 3C were acquired at different degrees of exposures when a subject does not move at all. Since the exposures are different, i-th pixels of the first through third images $I_1$ through $I_3$ may have different levels of brightness. However, the location of an i-th pixel when the pixels of the first image $I_1$ are arranged in a sequence from a pixel having the lowest brightness to a pixel having the highest brightness according to the brightness levels is similar to that of an i-th pixel when the pixels of the second image $I_2$ are arranged in a sequence from a pixel having the lowest brightness to a pixel having the highest brightness according to the brightness levels. This is because subject-illumination conditions and the like for the first image data and the second image data are similar to each other due to a similarity between the points of time when the first image data and the second image data are acquired. Thus, although the exposures are different, most of the level values of the respective i-th pixels of the first through third images $I_1$ through $I_3$ are identical to one another.

However, if a part of the subject moves during a period of time between when the first image data is acquired and when the second image data is acquired, the level value of the i-th pixel of the first image $I_1$ may be different from that of the i-th pixel of the second image $I_2$, because brightness may drastically change in an image area corresponding to the moving subject part. Accordingly, when the level value of the i-th pixel of the j-th image is different from that of the i-th pixel of the R-th image, the motion data $M_{i,j}$ of the i-th pixel of the j-th image has a value of $\beta$ (for example, 1).

Figure 5A:
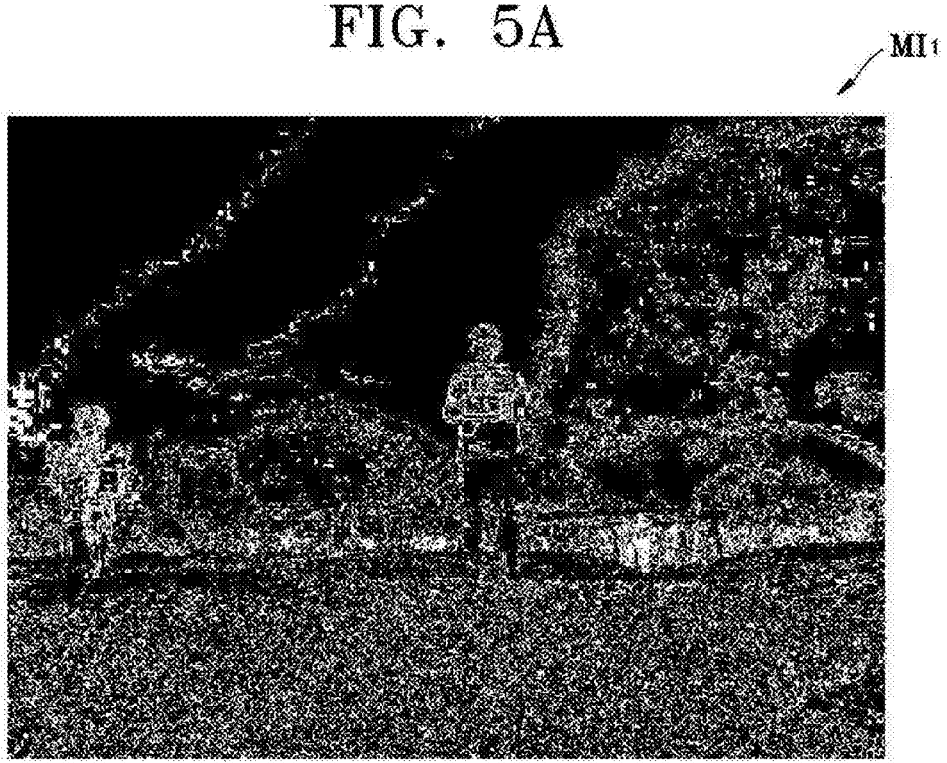
FIGS. 5A and 5B are pictorial diagrams illustrating a first motion image and a third motion image, respectively, that schematically and brightly represent portions of images from the first and third image data, which are determined as motion areas according to motion data acquired by a motion data acquiring unit of the digital photographing apparatus illustrated in FIGS. 1 and 2.
Figure 5B:

FIGS. 5A and 5B illustrate a first motion image $MI_1$ and a third motion image $MI_3$, respectively, that schematically and brightly represent portions of the first and third images $I_1$ and $I_3$, which are determined as motion areas according to the motion data acquired by the motion data acquiring unit 53. Since the third image $I_3$ illustrated in FIG. 3C is an image acquired during a long exposure, a portion of the sky, which is relatively bright within the third image $I_3$, is saturated and thus is entirely represented as pixels having the highest brightness. Thus, when the saturated portion is compared with a corresponding portion of the second image $I_2$ (see FIG. 3B) which is a reference image having the sky represented with different brightnesses, the saturated portion is determined as a motion area. Accordingly, a large area of the sky in the third motion image $MI_3$ is displayed as a motion area.

The first weight data acquiring unit 57 acquires first weight data $ME_{i,j}$ which is to be added to the i-th pixel of the j-th image, according to Equation 2, that is, acquires first weight data to be added to all pixels of each of the first through P-th image data.

$$ME_{i,j} = \begin{cases} \gamma, & \text{for } j = R \\ \gamma, & \text{for } M_{i,j} = \alpha, j \neq R \\ \delta, & \text{for } M_{i,j} = \beta, j \neq R \end{cases} \quad \text{[Equation 2]}$$

$$(\gamma > \delta \geq 0)$$

where $\gamma$ may be 1, $\delta$ may be 0, and $\alpha$ and $\beta$ may be 0 and 1, respectively, as described above. The meaning of the first weight data $ME_{i,j}$ will now be described.

When final image data is obtained by synthesizing the first through P-th image data, a high weight is applied to each pixel of the R-th image, which is the reference image, ($ME_{i,R}=\gamma>\delta$, for the i-th pixel of the R-th image). A high weight is also applied to each pixel that does not belong to a motion area from among the pixels of images other than the R-th image from among the first through P-th images, ($ME_{i,j}=\gamma>\delta$, $M_{i,j}=\alpha$, $j\neq R$, for the i-th pixel of the j-th image). A low weight is applied to each pixel that belongs to a motion area from among the pixels of the images other than the R-th image ($ME_{i,j}=\delta$, $M_{i,j}=\beta$, $j\neq R$, for the i-th pixel of the j-th image).

Accordingly, the final image data acquiring unit 59 acquires data of an i-th pixel of the final image data by synthesizing data of the respective i-th pixels of the first through P-th images by adding the first weight data $ME_{i,j}$ to the first through P-th image data. In this way, respective data of the pixels of the final image data are obtained.

In the digital photographing apparatus according to the present embodiment, when the final image data acquiring unit 59 synthesizes the first through P-th image data to acquire the final image data, the final image data acquiring unit 59 effectively reduces an influence of the data of each pixel belonging to a motion area from among the pixels of the images other than the R-th image from among the first through P-th images, thereby acquiring data about an image having a wide dynamic range and a high grayscale resolution.

The final image data acquiring unit 59 may synthesize the first through third image data by using various methods. For example, a method mentioned in P. Debevec and J. Malik, Recovering high dynamic range radiance maps from photographs, in *Proc. ACM SIGGRAPH*, pp. 369378, Los Angeles, Calif., August 1997 may be used to synthesize the first through third image data. This paper is incorporated by reference herein.

This paper discloses an operation of acquiring final image data in which m-th channel data of an i-th pixel is $E_{i,m}$, by using a second weight $w(z_{i,m,j})$ determined using Equation 3, according to Equation 7.

$$w(z_{i,m,j}) = \begin{cases} z_{i,m,j} - z_{min,m,j}, & \text{for } z_{i,m,j} \le \frac{1}{2}\left(\begin{array}{c} z_{min,m,j} + \\ z_{max,m,j} \end{array}\right) \\ z_{max,m,j} - z_{i,m,j}, & \text{otherwise} \end{cases}$$ [Equation 3]

$$\ln E_{i,m} = \frac{\sum_{j=1}^{P} w(z_{i,m,j})(\ln f^{-1}(z_{i,m,j}) - \ln \Delta t_j)}{\sum_{j=1}^{P} w(z_{i,m,j})}$$ [Equation 7]

In Equation 3, $z_{i,m,j}$ denotes m-th channel data of an i-th pixel of j-th image data, $z_{max,m,j}$ denotes m-th channel data having a maximum value from among respective m-th channel data of the pixels of the j-th image data, and $z_{min,m,j}$ denotes m-th channel data having a minimum value from among the respective m-th channel data of the pixels of the j-th image data. Generally, data of each pixel may have three pieces of channel data in the form of YCbCr, YUV, RGB, or the like. If the data of each pixel is in the form of YCbCr, first channel data of the pixel is Y data, second channel data thereof is Cb data, and third channel data thereof is Cr data. In other words, when the data of each pixel is in the form of YCbCr, $w(z_{i,1,j})$ is a weight for Y data of the i-th pixel of the j-th image, $w(z_{i,2,j})$ is a weight for Cb data of the i-th pixel of the j-th image, and $w(z_{i,3,j})$ is a weight for Cr data of the i-th pixel of the j-th image. In Equation 4, f(x) denotes a response function of a digital photographing apparatus, and $\Delta t_j$ denotes an exposure time used when the j-th image data is acquired.

Since the above-described paper supposes a case where a subject does not move at all when the first through P-th image data is acquired, if the subject moves, a final image appears blurred or the like, leading to a low-quality final image.

However, when the digital photographing apparatus according to the present embodiment uses Equations 3 and 7, Equation 7 is transformed into Equation 4 as follows and is then used.

$$\ln E_{i,m} = \frac{\sum_{j=1}^{P} w(z_{i,m,j})(ME_{i,j})(\ln f^{-1}(z_{i,m,j}) - \ln \Delta t_j)}{\sum_{j=1}^{P} w(z_{i,m,j})(ME_{i,j})}$$ [Equation 4]

In other words, the final image data acquiring unit 59 of the digital photographing apparatus according to the present embodiment acquires the final image data in which the m-th channel data of the i-th pixel is $E_{i,m}$, by using the second weight $w(z_{i,m,j})$ determined using Equation 3, according to Equation 4 including the first weight data $ME_{i,j}$, thereby acquiring data about an image having a wide dynamic range, a high grayscale resolution, and no blurring.

When the final image data acquiring unit 59 acquires the final image data, methods other than the method using Equations 3 and 7 may be used. For example, by combining the first weight data $ME_{i,j}$ into a method mentioned in J. Kuang, G. M. Johnson, and M. D. Fairchild, iCAM06: A refined image appearance model for HDR image rendering, *J. Vis. Commun. Image Representation*, vol. 18, pp. 406-414, October 2007, the data about the image having a wide dynamic range, a high grayscale resolution, and no blurring may be acquired.

FIG. 6 is a flowchart schematically illustrating a method of controlling a digital photographing apparatus, according to another embodiment of the invention.

Referring to FIG. 6, in operation S10, the first through P-th (where P is a positive integer) image data is acquired while the degree of exposure is increased to obtain different exposures. The operation S10 may be understood by referring to the description made above with reference to FIGS. 3A through 3C.

In operation S20, as for j-th image data, an i-th pixel of a j-th image corresponding to the j-th image data is classified into one of first through N-th levels according to brightness, and a level value $L_{i,j}$ of the level to which the i-th pixel belongs is granted to the i-th pixel. The classification is performed so that the numbers of pixels belonging to the respective levels are identical to one another, and is applied to each of first through P-th image data (that is, P=3). Here, N denotes a positive integer. The classification may be performed so that a pixel having the lowest brightness belongs to the first level and a pixel having the highest brightness belongs to the N-th level. Multi-level threshold maps in which pixels that belong to the same level are represented with the same color after the above-described classification will be understood by referring to the first, second, and third multi-level threshold maps $LI_1$, $LI_2$, and $LI_3$ described above with reference to FIGS. 4A through 4C.

In operation S30, if image data acquired during a moderate length exposure from among the first through P-th image data is R-th image data, motion data $M_{i,j}$ which is to be added to the i-th pixel of the j-th image, is acquired according to Equation 1. In this way, pieces of motion data to be applied to all pixels of each of first through P-th images from the first through P-th image data are acquired. A first motion image $MI_1$ and a third motion image $MI_3$ that schematically and brightly represent portions of the first and third images $I_1$ and $I_3$ of FIGS. 3A and 3C, respectively, which are determined as motion areas according to the acquired motion data, are the same as those illustrated in FIGS. 5A and 5B. The meanings of the first and third motion images $MI_1$ and $MI_3$ will be understood by referring to what has been described above with reference to FIGS. 5A and 5B.

In operation S60, first weight data $ME_{i,j}$ which is to be added to the i-th pixel of the j-th image, is acquired according to Equation 2, that is, first weight data to be added to all pixels of each of the first through P-th image data is acquired. The meaning of the first weight data $ME_{i,j}$ will be understood by referring to what has been described above with reference to Equation 2.

In operation S70, data of an i-th pixel of the final image data is acquired by synthesizing data of the respective i-th pixels of the first through P-th images by adding the first weight data $ME_{i,j}$ to the first through P-th image data. In this way, respective data of the pixels of the final image data are obtained.

In the method of controlling the digital photographing apparatus, according to the present embodiment, when the first through P-th image data are synthesized to acquire the final image data, an influence of the data of each pixel belonging to a motion area from among the pixels of the images other than the R-th image from among the first through P-th images is effectively reduced, thereby acquiring data about an image having a wide dynamic range and a high grayscale resolution.

The synthesis of the first through third image data performed in operation S70 may be performed by using various methods. For example, a method mentioned in the paper of P. Debevec and J. Malik may be used to synthesize the first through third image data. In other words, operation S70 is set to acquire the final image data in which the m-th channel data of the i-th pixel is $E_{i,m}$, by using the second weight $w(z_{i,m,j})$ determined using Equation 3, according to Equation 4 including the first weight data $ME_{i,j}$, thereby acquiring data about an image having a wide dynamic range, a high grayscale resolution, and no blurring.

A digital photographing apparatus according to another embodiment of the invention will now be described.

The digital photographing apparatus according to the present embodiment is different from the digital photographing apparatus of FIGS. 1 and 2 in that the motion data acquiring unit 53 performs clustering on the motion data $M_{i,j}$. In other words, similar to the digital photographing apparatus of FIGS. 1 and 2, if image data acquired during a moderate length exposure from among the first through P-th image data obtained at different exposures is R-th image data, the motion data acquiring unit 53 of the digital photographing apparatus according to the present embodiment acquires the motion data $M_{i,j}$, which is to be added to the i-th pixel of the j-th image, according to Equation 1. In this way, pieces of motion data to be applied to all pixels of each of first through P-th images corresponding to the first through P-th image data are acquired.

Thereafter, if a pixel having motion data of 0 is surrounded by pixels having motion data of 1 in each of images corresponding to image data other than the R-th image data from among the first through P-th image data, the motion data acquiring unit 53 of the digital photographing apparatus according to the present embodiment corrects the pixel having the motion data of 0 so as to have the motion data of 1. On the other hand, if a pixel having motion data of 1 is surrounded by pixels having motion data of 0 in each of the images corresponding to the image data other than the R-th image data, the motion data acquiring unit 53 of the digital photographing apparatus according to the present embodiment corrects the pixel having the motion data of 1 so as to have the motion data of 0. In this way, the motion data $M_{i,j}$ to be added to the i-th pixel of the j-th image of the j-th image data is acquired.

When the imaging device 30 of the digital photographing apparatus according to the present embodiment acquires data, noise or the like may be generated. In this case, pixels where noise has been generated have wrong brightness instead of ideal brightness, and thus, instead of ideal motion data, wrong motion data may be applied to the pixels where noise has been generated. Since the pixels where noise is generated exist locally, the clustering performed in the motion data acquiring unit 53 of the digital photographing apparatus according to the present embodiment may effectively prevent wrong motion data from being applied to pixels where noise has been generated.

Figure 7A:
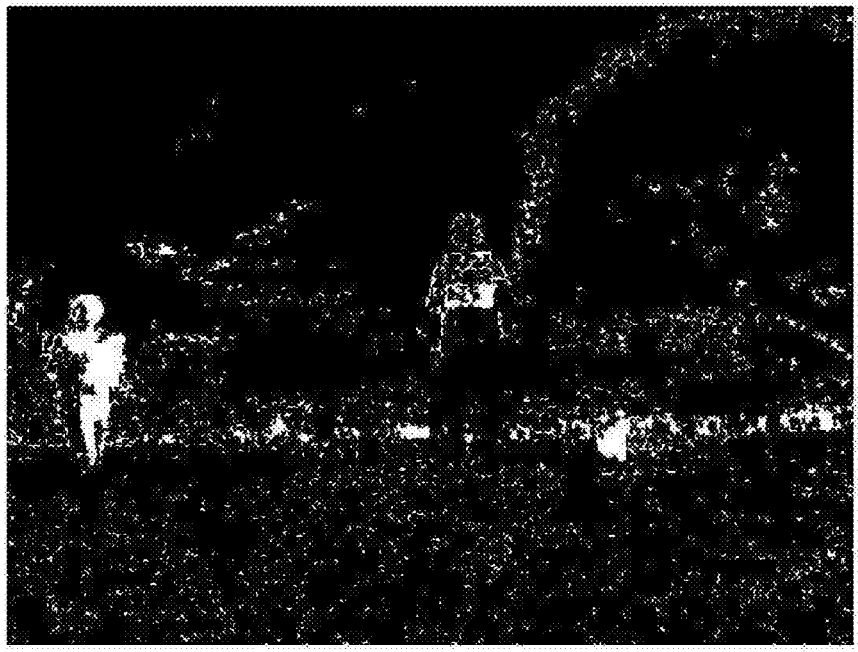
FIGS. 7A and 7B are pictorial diagrams illustrating a first motion image and a third motion image, respectively, that schematically and brightly represent portions of images from the first and third image data, which are determined as motion areas according to motion data acquired by a motion data acquiring unit of a digital photographing apparatus according to another embodiment of the invention.
Figure 7B:

FIGS. 7A and 7B illustrate a first motion image $MI_1'$ and a third motion image $MI_3'$, respectively, that schematically and brightly represent respective portions of the first and third images $I_1$ and $I_3$ of FIGS. 3A and 3C, which are determined as motion areas according to the motion data acquired by the motion data acquiring unit 53 of the digital photographing apparatus according to the present embodiment. In other words, the first motion image $MI_1'$ illustrated in FIG. 7A is a result of clustering of the first motion image $MI_1$ of FIG. 5A and the third motion image $MI_3'$ of FIG. 7B is a result of clustering of the third motion image $MI_3$ of FIG. 5B.

In the digital photographing apparatus according to the present embodiment, when the final image data acquiring unit 59 synthesizes the first through P-th image data to acquire the final image data, the final image data acquiring unit 59 effectively reduces influences of the respective data of pixels belonging to a motion area from among the pixels of the images other than the R-th image from among the first through P-th images, thereby acquiring data about an image having a wide dynamic range and a high grayscale resolution. In addition, the final image data acquiring unit 59 may acquire a high-quality final image by effectively preventing wrong motion data from being applied due to noise.

Figure 8:
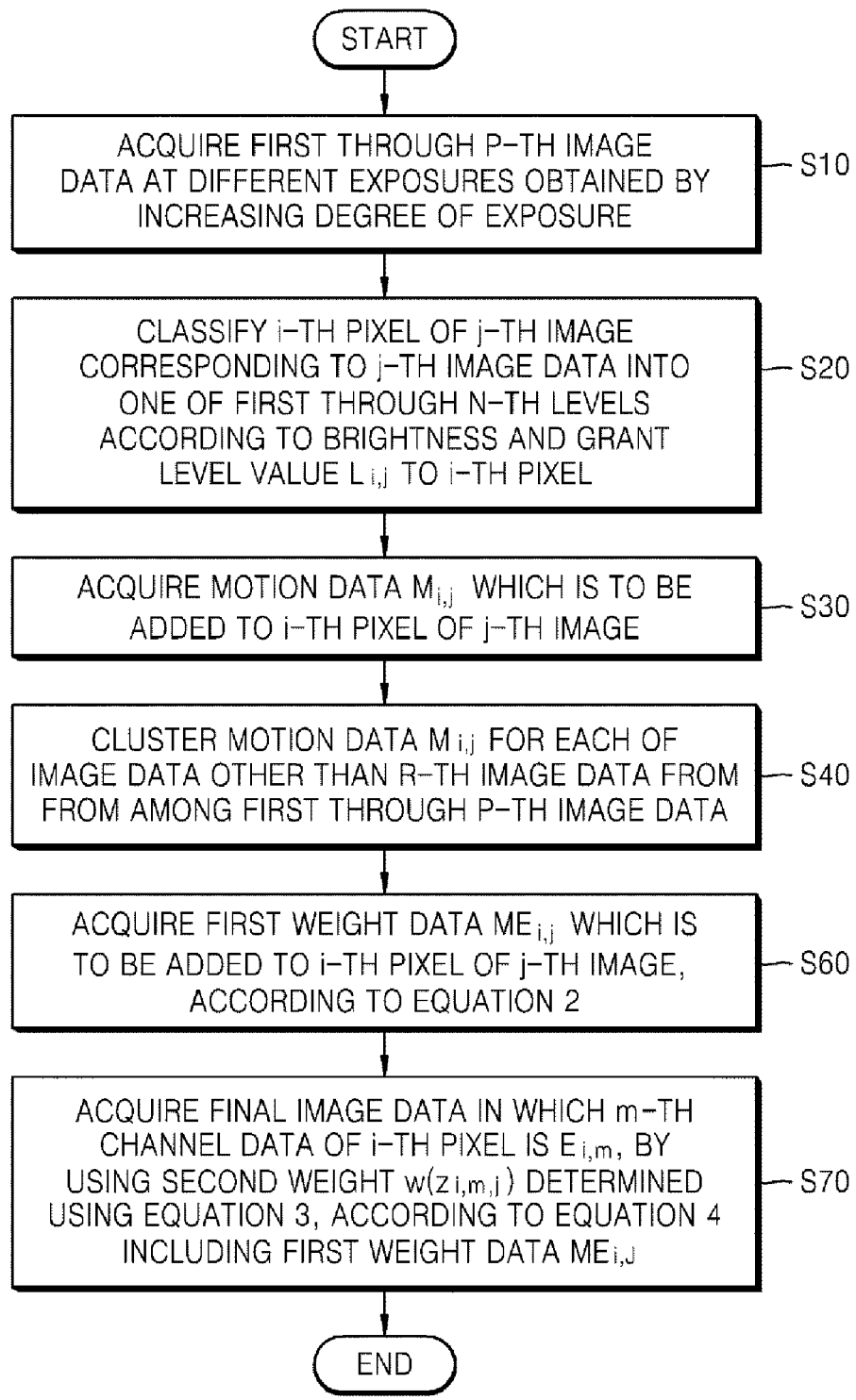
FIG. 8 is a flowchart schematically illustrating a method of controlling a digital photographing apparatus, according to another embodiment of the invention.

FIG. 8 is a flowchart schematically illustrating a method of controlling a digital photographing apparatus, according to another embodiment of the invention.

The method of FIG. 8 is different from the method of FIG. 6 in that after the motion data $M_{i,j}$ is obtained according to Equation 1 in operation S30, the motion data $M_{i,j}$ is clustered. In other words, after the motion data $M_{i,j}$, which is added to the i-th pixel of the j-th image data, is acquired according to Equation 1 in operation S30, if a pixel having motion data of 0 is surrounded by pixels having motion data of 1 in each of images corresponding to image data other than the R-th image data from among the first through P-th image data, the pixel having the motion data of 0 is corrected to have the motion data of 1, and if a pixel having motion data of 1 is surrounded by pixels having motion data of 0 in each of the images corresponding to the image data other than the R-th image data, the pixel having the motion data of 1 is corrected to have the motion data of 0, thereby changing the motion data $M_{i,j}$ to be added to the i-th pixel of the j-th image of the j-th image data, in operation S40.

In the method of controlling the digital photographing apparatus, according to the present embodiment, when the first through P-th image data are synthesized to acquire the final image data, influences of the respective data of pixels belonging to a motion area from among the pixels of the images other than the R-th image from among the first through P-th images are effectively reduced, thereby acquiring data about an image having a wide dynamic range and a high grayscale resolution. In addition, a high-quality final image may be acquired by effectively preventing wrong motion data from being applied due to noise.

Figure 9:
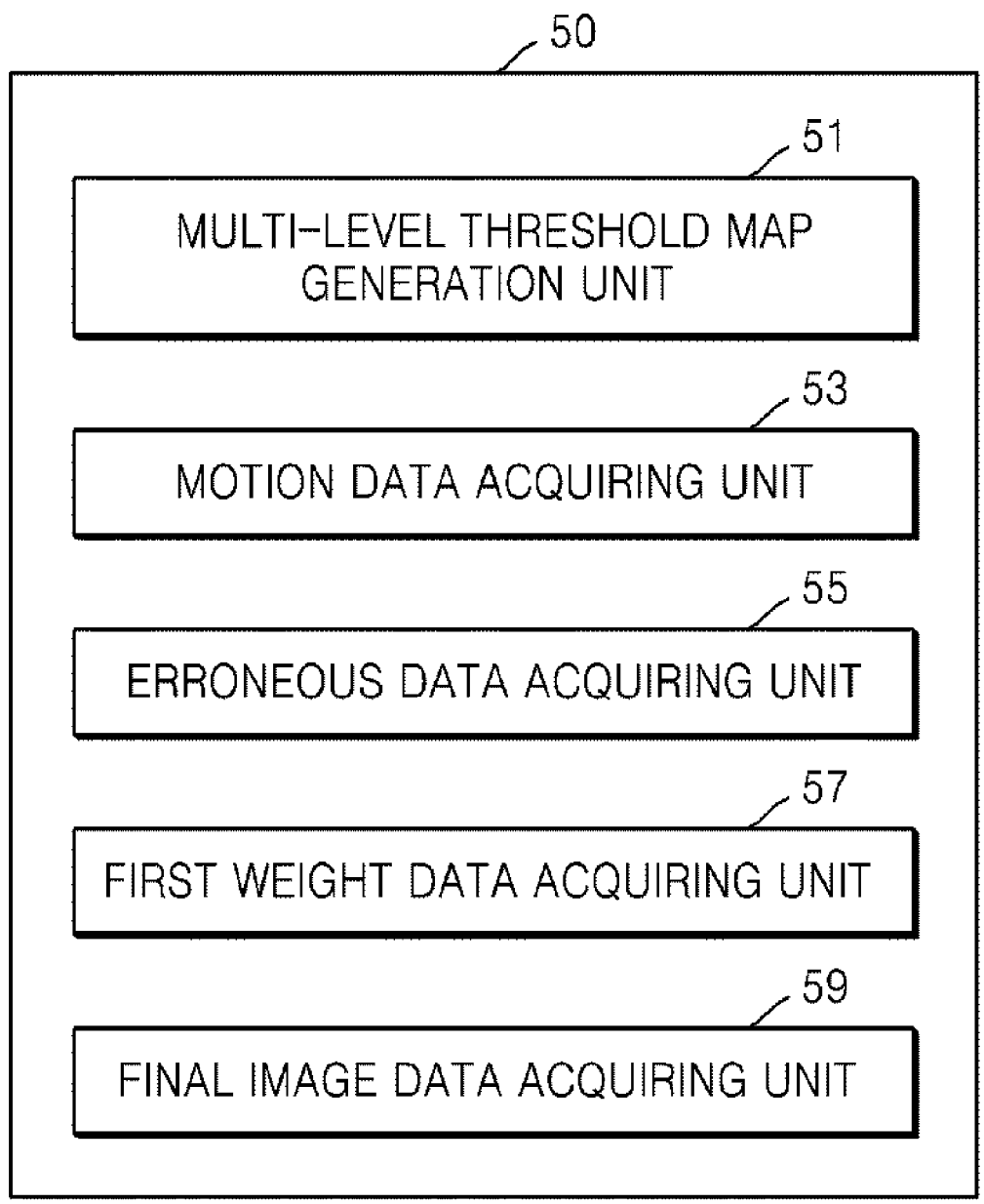
FIG. 9 is a block diagram of a portion of a digital photographing apparatus according to another embodiment of the invention.

FIG. 9 is a block diagram of a portion of a digital photographing apparatus according to another embodiment of the invention.

The digital photographing apparatus according to the present embodiment is different from the digital photographing apparatus of FIGS. 1 and 2 in that an error data acquiring unit 55 is further included and that the first weight data acquiring unit 57 acquires first weight data in consideration of error data acquired by the error data acquiring unit 55. The error data acquiring unit 55 may be a part of the digital signal processing unit 50 as illustrated in FIG. 9, or may be a component separate from the digital signal processing unit 50, or may be a part of another component. As such, the structure of the error data acquiring unit 55 may vary.

Similar to the digital photographing apparatus of FIGS. 1 and 2, the imaging device 30 of the digital photographing apparatus according to the present embodiment acquires first through P-th image data while increasing the degree of exposure so as to obtain different exposures. As for j-th image data, the multi-level threshold map generation unit 51 classifies an i-th pixel of a j-th image corresponding to the j-th image data into one of first through N-th levels according to brightness and applies, to the i-th pixel, a level value $L_{i,j}$ of the level to which the i-th pixel belongs. The classification is performed so that the numbers of pixels belonging to the respective levels are identical to one another, and is applied to each of first through P-th image data (that is, P=3). Here, N denotes a positive integer.

When the multi-level threshold map generation unit 51 classifies the pixels of the j-th image according to brightness, pixels may be classified into different levels although they have the same brightness. For example, if the j-th image from the j-th image data has 160000 pixels, the 160000 pixels may be classified into 8 levels so that 20000 pixels belong to each of the 8 levels. In this case, N is equal to 8. The 160000 pixels may be arranged according to brightness, that is, in a sequence from a pixel having the lowest brightness to a pixel having the highest brightness. Then, the 160000 pixels may be classified in such a way that 20000 pixels starting from the pixel having the lowest brightness are classified into a first level, the next 20000 pixels are classified into a second level, and the next 20000 pixels are classified into a third level. Although a p-th pixel and a q-th pixel of the j-th image have the same brightness, 20000 pixels including the p-th pixel may be classified into an l-th level. Accordingly, although the q-th pixel has the same brightness as the p-th pixel, the q-th pixel may be classified into a (l+1)th level. Due to this classification, although the i-th pixel of the j-th image does not belong to an area moved as compared with the R image, the i-th pixel may be determined to belong to the moved area.

Accordingly, in order to address this problem, if brightness data of the i-th pixel of the j-th image of the j-th image data is $I_{i,j}$ and brightness data of a pixel that functions to distinguish a k-th level and a (k+1)th level from each other from among the pixels of the j-th image is $T_{j,k}$, the digital photographing apparatus according to the present embodiment acquires error data $E_{i,j}$ according to Equation 5 by using the error data acquiring unit 55, thereby acquiring error data which is to be added to all of the pixels of each of the first through P-th image data.

$$E_{i,j} = \begin{cases} \zeta, & \text{for } T_{j,k}-1 \le I_{i,j} \le T_{j,k}+1 \\ \eta, & \text{otherwise} \end{cases} \quad [\text{Equation 5}]$$

$$(1 \le k < N)(\zeta > \eta \ge 0)$$

where $\zeta$ may be 1 and $\eta$ may be 0. Equation 5 means that if the brightness $I_{i,j}$ of the i-th pixel of the j-th image is in between $T_{j,k}$, which is the brightness data of the pixel that functions to distinguish the k-th and (k+1)th levels from each other from among the pixels of the j-th image (for example, brightness data of the p-th pixel and the q-th pixel), and ±1, the i-th pixel is a pixel where errors may occur, and thus the error data $E_{i,j}$ is set to have $\zeta$ (for example, 1), and otherwise, the i-th pixel is a pixel where errors rarely occur, and thus the error data $E_{i,j}$ is set to have $\eta$ (for example, 0).

The first weight data acquiring unit 57 acquires first weight data $ME_{i,j}$ which is to be added to the i-th pixel of the j-th image, according to Equation 6, that is, acquires first weight data to be added to all pixels of each of the first through P-th image data.

$$ME_{i,j} = \begin{cases} \gamma, & \text{for } j = R \\ \gamma, & \text{for } M_{i,j} = \alpha, E_{i,j} = E_{i,R} = \eta, j \ne R \\ \delta, & \text{for } M_{i,j} = \beta, E_{i,j} = E_{i,R} = \eta, j \ne R \\ \varepsilon, & \text{for } E_{i,j} \mid E_{i,R} = \zeta, j \ne R \end{cases} \quad [\text{Equation 6}]$$

$$(\gamma > \varepsilon > \delta \ge 0)$$

where $\gamma$ may be 1, $\delta$ may be 0, $\epsilon$ may be 0.2, and $\alpha$, $\beta$, $\zeta$ and $\eta$ may be 0, 1, 1, and 0, respectively, as described above. "$E_{i,j} \mid E_{i,R}=\zeta$" denotes a case where "$E_{i,j}=\zeta$ and $E_{i,R} \ne \zeta$", a case where "$E_{i,j} \ne \zeta$ and $E_{i,R}=\zeta$", or a case where "$E_{i,j}=\zeta$ and $E_{i,R}=\zeta$". The meaning of the first weight data $ME_{i,j}$ will now be described.

When final image data is obtained by synthesizing the first through P-th image data, a high weight is applied to each pixel of the R-th image, which is the reference image, ($ME_{i,R}=\gamma > \epsilon > \delta$, for the i-th pixel of the R-th image). A high weight is also applied to each pixel that does not belong to a motion area from among the pixels of images other than the R-th image from among the first through P-th images, ($ME_{i,j}=\gamma > \epsilon > \delta$, $M_{i,j}=\alpha$, $j \ne R$, for the i-th pixel of the j-th image). However, only when both error data in the i-th pixel of each of the images other than the R-th image from among the first through P-th images and error data in the i-th pixel of the R-th image are $\eta$, which indicates no occurrence of errors, ($E_{i,j}=E_{i,R}=\eta$), is a high weight applied to the i-th pixel of each of the images other than the R-th image from among the first through P-th images. If both pieces of error data indicate the possibility that errors occur, an intermediate weight is applied to the i-th pixel of each of the images other than the R-th image from among the first through P-th images ($ME_{i,j}=\epsilon$).

A low weight is applied to each pixel that belongs to a motion area from among the pixels of the images other than the R-th image ($ME_{i,j}=\delta$, $M_{i,j}=\beta$, $j \ne R$, for the i-th pixel of the j-th image). However, only when both error data in the i-th pixel of each of the images other than the R-th image from among the first through P-th images and error data in the i-th pixel of the R-th image are $\eta$, which indicates no occurrence of errors, ($E_{i,j}=E_{i,R}=\eta$), is a low weight applied to the i-th pixel of each of the images other than the R-th image from among the first through P-th images. If both pieces of error data indicate the possibility that errors occur, an intermediate weight is applied to the i-th pixel of each of the images other than the R-th image from among the first through P-th images ($ME_{i,j}=\epsilon$).

As described above, in the case of the images other than the R-th image from among the first through P-th images, a low weight is applied to pixels that belong to a motion area, a high weight is applied to pixels that do not belong to a moved area, and an intermediate weight in between the high and low weights is applied to pixels where errors may occur, whereby final image data corresponding to a high-quality final image may be acquired. The use of the first weight data $ME_{i,j}$ by the final image data acquiring unit 59 in order to acquire the final image data is the same as what has been described above in relation to the embodiment of FIGS. 1 through 5B.

Figure 10:
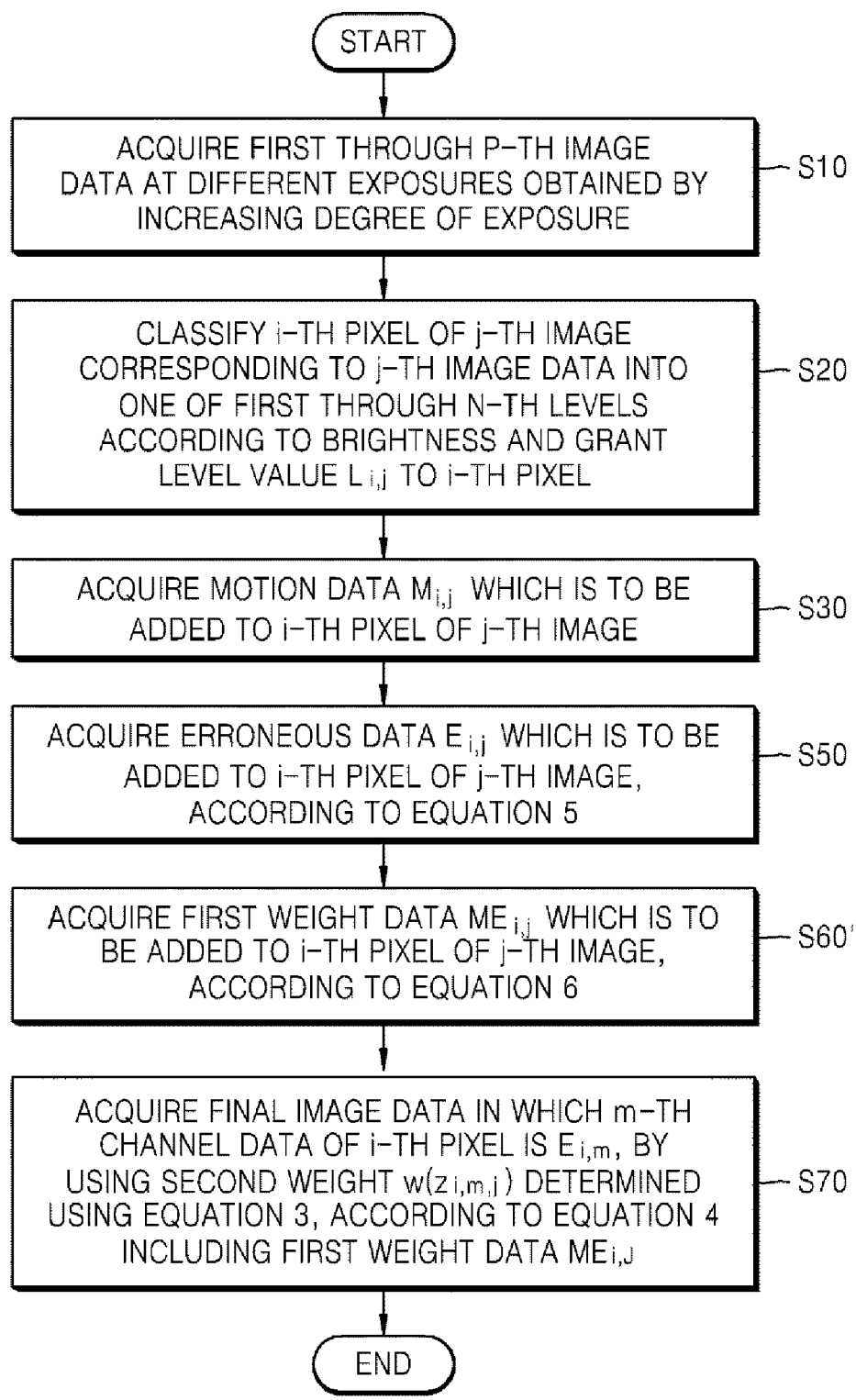
FIG. 10 is a flowchart schematically illustrating a method of controlling a digital photographing apparatus, according to another embodiment of the invention.

FIG. 10 is a flowchart schematically illustrating a method of controlling a digital photographing apparatus, according to another embodiment of the invention.

The digital photographing apparatus controlling method according to the present embodiment is different from the digital photographing apparatus controlling method of FIG. 6 in that operation S30 is followed by operation S50 of acquiring error data and that the first weight data is acquired according to Equation 6 using the error data in operation S60'. The order of operations S30 and S50 illustrated in FIG. 10 may be reversed, and operations S30 and S50 may be performed in parallel.

In operation S50, if the brightness data of the i-th pixel of the j-th image of the j-th image data is $I_{i,j}$ and the brightness data of the pixel that functions to distinguish a k-th level and a (k+1)th level from each other from among the pixels of the j-th image is $T_{j,k}$, the error data $E_{i,j}$ is acquired according to Equation 5, thereby acquiring error data which is to be added to all of the pixels of each of the first through P-th image data. In operation S60', the first weight data $ME_{i,j}$ which is to be added to the i-th pixel of the j-th image, is acquired in consideration of the error data $E_{i,j}$ according to Equation 6, that is, first weight data to be added to all pixels of each of the first through P-th image data is acquired. The acquisition of the error data and the acquisition of the first weight data in consideration of the error data will be understood by referring to the embodiment of FIG. 9.

In the digital photographing apparatus controlling method according to the present embodiment as described above, in the case of the images other than the R-th image from among the first through P-th images, a low weight is applied to pixels that belong to a motion area, a high weight is applied to pixels that do not belong to a moved area, and an intermediate weight in between the high and low weights is applied to pixels where errors may occur, whereby final image data corresponding to a high-quality final image may be acquired. Operation S70 of using the first weight data $ME_{i,j}$ in order to acquire the final image data is the same as what has been described above in relation to the embodiment of FIG. 6.

A digital photographing apparatus according to another embodiment of the invention will now be described.

The digital photographing apparatus according to the present embodiment is different from the digital photographing apparatus of FIG. 9 in that the motion data acquiring unit 53 performs clustering on the motion data $M_{i,j}$. In other words, similar to the digital photographing apparatus of FIG. 9, if image data acquired during a moderate length exposure from among the first through P-th image data obtained at different exposures is R-th image data, the motion data acquiring unit 53 of the digital photographing apparatus according to the present embodiment acquires the motion data $M_{i,j}$, which is to be added to the i-th pixel of the j-th image, according to Equation 1. In this way, pieces of motion data to be applied to all pixels of each of first through P-th images corresponding to the first through P-th image data are acquired.

Thereafter, if a pixel having motion data of 0 is surrounded by pixels having motion data of 1 in each of images corresponding to image data other than the R-th image data from among the first through P-th image data, the motion data acquiring unit 53 of the digital photographing apparatus according to the present embodiment corrects the pixel having the motion data of 0 so as to have the motion data of 1. On the other hand, if a pixel having motion data of 1 is surrounded by pixels having motion data of 0 in each of the images corresponding to the image data other than the R-th image data, the motion data acquiring unit 53 of the digital photographing apparatus according to the present embodiment corrects the pixel having the motion data of 1 so as to have the motion data of 0. In this way, the motion data $M_{i,j}$ to be added to the i-th pixel of the j-th image of the j-th image data is acquired.

When the imaging device 30 of the digital photographing apparatus according to the present embodiment acquires data, noise or the like may be generated. In this case, pixels where noise has been generated have wrong brightness instead of ideal brightness, and thus, instead of ideal motion data, wrong motion data may be applied to the pixels where noise has been generated. Since the pixels where noise is generated exist locally, the clustering performed in the motion data acquiring unit 53 of the digital photographing apparatus according to the present embodiment may effectively prevent wrong motion data from being applied to pixels where noise has been generated.

In the digital photographing apparatus according to the present embodiment, when the final image data acquiring unit 59 synthesizes the first through P-th image data to acquire the final image data, the final image data acquiring unit 59 effectively reduces influences of the respective data of pixels belonging to a motion area from among the pixels of the images other than the R-th image from among the first through P-th images, thereby acquiring data about an image having a wide dynamic range and a high grayscale resolution. In addition, the final image data acquiring unit 59 may acquire a high-quality final image due to effective prevention of wrong motion data from being applied due to noise.

FIG. 11 is a flowchart schematically illustrating a method of controlling a digital photographing apparatus, according to another embodiment of the invention.

The method of FIG. 11 is different from the method of FIG. 10 in that after the motion data $M_{i,j}$ is obtained according to Equation 1 in operation S30, the motion data $M_{i,j}$ is clustered. In other words, after the motion data $M_{i,j}$, which is added to the i-th pixel of the j-th image data, is acquired according to Equation 1 in operation S30, if a pixel having motion data of 0 is surrounded by pixels having motion data of 1 in each of images corresponding to image data other than the R-th image data from among the first through P-th image data, the pixel having the motion data of 0 is corrected to have the motion data of 1, and if a pixel having motion data of 1 is surrounded by pixels having motion data of 0 in each of the images corresponding to the image data other than the R-th image data, the pixel having the motion data of 1 is corrected to have the motion data of 0, thereby changing the motion data $M_{i,j}$ to be added to the i-th pixel of the j-th image of the j-th image data, in operation S40.

In the method of controlling the digital photographing apparatus, according to the present embodiment, when the first through P-th image data are synthesized to acquire the final image data, influences of the respective data of pixels belonging to a motion area from among the pixels of the images other than the R-th image from among the first through P-th images are effectively reduced, thereby acquiring data about an image having a wide dynamic range and a high grayscale resolution. In addition, a high-quality final image may be acquired by effectively preventing wrong motion data from being applied due to noise.

Figure 12A:
FIG. 12A is a pictorial diagram schematically illustrating a part of a final image acquired according to a typical method of controlling a digital photographing apparatus.
Figure 12B:
FIG. 12B is a conceptual diagram schematically illustrating a part of a final image acquired according to the method of FIG. 11.

FIG. 12A is a conceptual diagram schematically illustrating a part of a final image acquired by a digital photographing apparatus for acquiring a final image by synthesizing a plurality of pieces of image data without considering a motion area. FIG. 12B is a conceptual diagram schematically illustrating a part of a final image acquired by the digital photographing apparatus which is different from the digital photographing apparatus of FIG. 9 in that the motion data acquiring unit 53 performs clustering on the motion data $M_{i,j}$. FIG. 12B may also be a conceptual diagram schematically illustrating a part of a final image acquired according to the method of FIG. 11. It should be considered that FIG. 12B is a result of intentional magnification of a small part of the final image. In FIG. 12A, the eyes, nose, lips, etc. of a person are unclear. However, in FIG. 12B, the eyes, nose, lips, etc. of a person are clearer than those of FIG. 12A.

In a digital photographing apparatus according to an embodiment of the invention, a controlling method thereof, and a recording medium having recorded thereon a program for executing the controlling method, data about an image having a wide dynamic range and a high grayscale resolution may be acquired.

Programs for executing controlling methods according to the above-described embodiments of the invention and their modified embodiments in a digital photographing apparatus may be stored in a recording medium. The recording medium may be the storage medium 70 of FIG. 1, or the memory 60 of FIG. 1, or any other recording medium. Examples of the recording medium include magnetic storing media (e.g., ROMs, floppy disks, hard disk, and the like), optical reading media (e.g., CD-ROMs (compact disc-read-only memory), DVDs (digital versatile discs), and other storage media.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

While various embodiments of the invention are described in terms of functional block components, such functional blocks may be realized by any number of hardware and/or software components configured to perform the specified functions. For example, embodiments of the invention may employ various integrated circuit components, processing elements, logic elements, etc.

The particular implementations shown and described herein are illustrative examples of the invention and are not intended to otherwise limit the scope of the invention in any way. The connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the invention.

What is claimed is:

1. A digital photographing apparatus comprising:
an imaging device that acquires a reference image at a first exposure, and a plurality of additional images at exposures different from the first exposure, the reference image and the plurality of additional images each having a plurality of pixels;
a motion data acquiring unit that acquires motion data for each pixel of the plurality of additional images, wherein the motion data for a pixel is a first motion data value if the pixel is in a non-motion area when compared to the reference image and a second motion data value if the pixel is in a motion area when compared to the reference image;
a first weight data acquiring unit that acquires first weight data, wherein the first weight data is a first weight for pixels with the first motion data value and a second weight lower than the first weight for pixels with the second motion data value; and
a final image data acquiring unit that synthesizes the pixels of the reference image and the plurality of additional images based on first weight data.

2. The digital photographing apparatus of claim 1, further comprising a multi-level threshold map generation unit that classifies the plurality of pixels of each of the reference image and the plurality of additional images into a plurality of levels according to brightness.

3. The digital photographing apparatus of claim 2, wherein motion data for an i-th pixel of a j-th image with a level value of $L_{i,j}$ is $M_{i,j}$ and is assigned according to Equation 1 based on the reference image R and an i-th pixel of the reference image R with a level value of $L_{i,R}$:

$$M_{i,j} = \begin{cases} \alpha, & \text{for } j = R \\ \beta, & \text{for } |L_{i,R} - L_{i,j}| \geq 1, j \neq R \\ \alpha, & \text{otherwise} \end{cases} \quad [\text{Equation 1}]$$

$$(0 \leq \alpha < \beta).$$

4. The digital photographing apparatus of claim 3, wherein first weight data for an i-th pixel of a j-th image is $ME_{i,j}$ and is assigned according to Equation 2 based on the reference image R:

$$ME_{i,j} = \begin{cases} \gamma, & \text{for } j = R \\ \gamma, & \text{for } M_{i,j} = \alpha, j \neq R \\ \delta, & \text{for } M_{i,j} = \beta, j \neq R \end{cases} \quad [\text{Equation 2}]$$

$$(\gamma > \delta \geq 0).$$

5. The digital photographing apparatus of claim 4, wherein when a response function of the digital photographing apparatus is f(x), an exposure time used when j-th image data is acquired is $\Delta t_j$, m-th channel data of the i-th pixel of the j-th image data is $z_{i,m,j}$, m-th channel data having a maximum value from among respective m-th channel data of the pixels of the j-th image data is $z_{max,m,j}$, and m-th channel data having a minimum value from among the respective m-th channel data of the pixels of the j-th image data is $z_{min,m,j}$, the final image data acquiring unit acquires final image data in which the m-th channel data of the i-th pixel is $E_{i,m}$, by using a second weight $w(z_{i,m,j})$ determined using Equation 3, according to Equation 4:

$$w(z_{i,m,j}) = \begin{cases} z_{i,m,j} - z_{min,m,j}, & \text{for } z_{i,m,j} \leq \frac{1}{2}\left(\begin{array}{c} z_{min,m,j} + \\ z_{max,m,j} \end{array}\right) \\ z_{max,m,j} - z_{i,m,j}, & \text{otherwise} \end{cases} \quad \text{[Equation 3]}$$

$$\ln E_{i,m} = \frac{\sum_{j=1}^{P} w(z_{i,m,j})(ME_{i,j})(\ln f^{-1}(z_{i,m,j}) - \ln \Delta t_j)}{\sum_{j=1}^{P} w(z_{i,m,j})(ME_{i,j})}. \quad \text{[Equation 4]}$$

6. The digital photographing apparatus of claim 1, wherein the multi-level threshold map generation unit is designed to classify the plurality of pixels of an image such that a pixel having the lowest brightness in the image belongs to a first brightness level and a pixel having a higher brightness belongs to a level higher than the first brightness level.

7. The digital photographing apparatus of claim 3, wherein the motion data acquiring unit is designed to correct a pixel having a motion data of 0 to have a motion data of 1 if the pixel is surrounded by pixels having motion data of 1, and to correct a pixel having a motion data of 1 to have a motion data of 0 if the pixel is surrounded by pixels having motion data of 0.

8. The digital photographing apparatus of claim 3, further comprising:
an error data acquiring unit that acquires error data $E_{i,j}$ according to Equation 5 when brightness data of an i-th pixel of a j-th image is $I_{i,j}$ and brightness data of a pixel that functions to distinguish a k-th level and a (k+1)th level from each other from among the pixels of the j-th image is $T_{j,k}$:

$$E_{i,j} = \begin{cases} \zeta, & \text{for } T_{j,k} - 1 \leq I_{i,j} \leq T_{j,k} + 1 \\ \eta, & \text{otherwise} \end{cases} \quad \text{[Equation 5]}$$

$$(1 \leq k < N)(\zeta > \eta \geq 0).$$

9. The digital photographing apparatus of claim 8, wherein first weight data for an i-th pixel of a j-th image is $ME_{i,j}$ and is assigned according to Equation 6 based on the reference image R:

$$ME_{i,j} = \begin{cases} \gamma, & \text{for } j = R \\ \gamma, & \text{for } M_{i,j} = \alpha, E_{i,j} = E_{i,R} = \eta, j \neq R \\ \delta, & \text{for } M_{i,j} = \beta, E_{i,j} = E_{i,R} = \eta, j \neq R \\ \varepsilon & \text{for } E_{i,j} | E_{i,R} = \zeta, j \neq R \end{cases} \quad \text{[Equation 6]}$$

$$(\gamma > \varepsilon > \sigma \geq 0).$$

10. A method of controlling a digital photographing apparatus, the method comprising:
acquiring a reference image at a first exposure, and a plurality of additional images at exposures different from the first exposure, the reference image and the plurality of additional images each having a plurality of pixels;
acquiring motion data for each pixel of the plurality of additional images, wherein the motion data for a pixel is a first motion data value if the pixel is in a non-motion area when compared to the reference image and a second motion data value if the pixel is in a motion area when compared to the reference image;
acquiring first weight data, wherein the first weight data is a first weight for pixels with the first motion data value and a second weight lower than the first weight for pixels with the second motion data value; and
synthesizing the pixels of the reference image and the plurality of additional images based on first weight data.

11. The method of claim 10, further comprising:
classifying the plurality of pixels of each of the reference image and the plurality of additional images into a plurality of levels according to brightness.

12. The method of claim 11, wherein motion data for an i-th pixel of a j-th image with a level value of $L_{i,j}$ is $M_{i,j}$ and is assigned according to Equation 1 based on the reference image R and an i-th pixel of the reference image R with a level value of $L_{i,R}$:

$$M_{i,j} = \begin{cases} \alpha, & \text{for } j = R \\ \beta, & \text{for } |L_{i,R} - L_{i,j}| \geq 1, j \neq R \\ \alpha, & \text{otherwise} \end{cases} \quad \text{[Equation 1]}$$

$$(0 \leq \alpha < \beta).$$

13. The method of claim 12, wherein first weight data for an i-th pixel of a j-th image is $ME_{i,j}$ and is assigned according to Equation 2 based on the reference image R:

$$ME_{i,j} = \begin{cases} \gamma, & \text{for } j = R \\ \gamma, & \text{for } M_{i,j} = \alpha, j \neq R \\ \delta, & \text{for } M_{i,j} = \beta, j \neq R \end{cases} \quad \text{[Equation 2]}$$

$$(\gamma > \delta \geq 0).$$

14. The method of claim 13, wherein when a response function of the digital photographing apparatus is f(x), an exposure time used when j-th image data is acquired is $\Delta t_j$, m-th channel data of the i-th pixel of the j-th image data is $z_{i,m,j}$, m-th channel data having a maximum value from among respective m-th channel data of the pixels of the j-th image data is $z_{max,m,j}$, and m-th channel data having a minimum value from among the respective m-th channel data of the pixels of the j-th image data is $z_{min,m,j}$, final image data is acquired in which the m-th channel data of the i-th pixel is $E_{i,m}$, by using a second weight $w(z_{i,m,j})$ determined using Equation 3, according to Equation 4:

$$w(z_{i,m,j}) = \begin{cases} z_{i,m,j} - z_{min,m,j}, & \text{for } z_{i,m,j} \leq \frac{1}{2}\left(\begin{array}{c} z_{min,m,j} + \\ z_{max,m,j} \end{array}\right) \\ z_{max,m,j} - z_{i,m,j}, & \text{otherwise} \end{cases} \quad \text{[Equation 3]}$$

$$\ln E_{i,m} = \frac{\sum_{j=1}^{P} w(z_{i,m,j})(ME_{i,j})(\ln f^{-1}(z_{i,m,j}) - \ln \Delta t_j)}{\sum_{j=1}^{P} w(z_{i,m,j})(ME_{i,j})}. \quad \text{[Equation 4]}$$

15. The method of claim 10, wherein the plurality of pixels of an image are classified such that a pixel having the lowest brightness in the image belongs to a first brightness level and a pixel having a higher brightness belongs to a level higher than the first brightness level.

16. The method of claim 12, wherein after acquiring the motion data $M_{i,j}$ for the i-th pixel of the j-th image according to Equation 1, a pixel having a motion data of 0 is corrected to have a motion data of 1 if the pixel is surrounded by pixels having motion data of 1, and a pixel having a motion data of 1 is corrected to have a motion data of 0 if the pixel is surrounded by pixels having motion data of 0.

17. The method of claim 12, further comprising:

acquiring error data $E_{i,j}$ according to Equation 5 when brightness data of an i-th pixel of a j-th image is $I_{i,j}$ and brightness data of a pixel that functions to distinguish a k-th level and a (k+1)th level from each other from among the pixels of the j-th image is $T_{j,k}$:

$$E_{i,j} = \begin{cases} \zeta, & \text{for } T_{j,k} - 1 \leq I_{i,j} \leq T_{j,k} + 1 \\ \eta, & \text{otherwise} \end{cases} \quad \text{[Equation 5]}$$

$$(1 \leq k < N)(\zeta > \eta \geq 0).$$

18. The method of claim 17, wherein first weight data for an i-th pixel of a j-th image is $ME_{i,j}$ and is assigned according to Equation 6 based on the reference image R:

$$ME_{i,j} = \begin{cases} \gamma, & \text{for } j = R \\ \gamma, & \text{for } M_{i,j} = \alpha, E_{i,j} = E_{i,R} = \eta, j \neq R \\ \delta, & \text{for } M_{i,j} = \beta, E_{i,j} = E_{i,R} = \eta, j \neq R \\ \varepsilon, & \text{for } E_{i,j} \mid E_{i,R} = \zeta, j \neq R \end{cases} \quad \text{[Equation 6]}$$

$$(\gamma > \varepsilon > \delta \geq 0).$$

19. A recording medium having recorded thereon a program for executing the method of claim 10.

20. A method of controlling a digital photographing apparatus comprising:

acquiring a reference image at a first exposure, the reference image having a plurality of pixels;

acquiring a first image and a second image, each at exposures different from the first exposure and each having a plurality of pixels;

classifying the plurality of pixels of the reference image and the first and second images into a plurality of levels based on brightness;

determining which pixels of the first and second images belong to motion areas and which pixels of the first and second images belong to non-motion areas based on their respective brightness levels; and assigning a higher weight value to each of the plurality of pixels of the first and second images belonging to non-motion areas than to each of the plurality of pixels of the first and second images belonging to motion areas.

* * * * *